(12) United States Patent
Yun et al.

(10) Patent No.: US 12,532,672 B2
(45) Date of Patent: Jan. 20, 2026

(54) SEMICONDUCTOR DEVICE INCLUDING SHIELD LAYER

(71) Applicant: SK hynix Inc., Icheon-si (KR)

(72) Inventors: Jong Min Yun, Icheon-si (KR); Soo Gil Kim, Icheon-si (KR); Soo Man Seo, Icheon-si (KR)

(73) Assignee: SK HYNIX INC., Icheon-si (KR)

(*) Notice: Subject to any disclaimer, the term of this patent is extended or adjusted under 35 U.S.C. 154(b) by 294 days.

(21) Appl. No.: 18/193,336

(22) Filed: Mar. 30, 2023

(65) Prior Publication Data

US 2024/0334849 A1 Oct. 3, 2024

(30) Foreign Application Priority Data

Jun. 17, 2022 (KR) .................. 10-2022-0074228

(51) Int. Cl.
*G11C 11/00* (2006.01)
*G11C 13/00* (2006.01)
*G11C 13/02* (2006.01)
*H10B 63/00* (2023.01)
*H10N 70/00* (2023.01)

(52) U.S. Cl.
CPC ..... *H10N 70/8833* (2023.02); *G11C 13/0007* (2013.01); *G11C 13/0009* (2013.01); *G11C 13/0011* (2013.01); *G11C 13/02* (2013.01); *H10B 63/80* (2023.02); *H10N 70/063* (2023.02); *H10N 70/841* (2023.02)

(58) Field of Classification Search
CPC ............. H10N 70/8833; H10N 70/063; H10N 70/841; H10N 50/10; H10N 70/00; H10N 70/20; H10N 70/231; H10N 70/826; H10N 70/8828; H10N 70/253; G11C 13/0007; G11C 13/0009; G11C 13/0011; G11C 13/02; H10B 63/80; H10B 61/10; H10B 63/20; H10B 63/24; H10B 63/84; H10B 63/10; H10B 63/30
USPC ........................................................ 365/148
See application file for complete search history.

(56) References Cited

U.S. PATENT DOCUMENTS

| 7,382,647 B1 * | 6/2008 | Gopalakrishnan ... G11C 13/003 365/100 |
| 10,475,985 B2 * | 11/2019 | Bhushan ................ H01L 24/20 |
| 2012/0193737 A1 | 8/2012 | Pang et al. |

(Continued)

FOREIGN PATENT DOCUMENTS

CN 113206192 * 8/2021 ......... G11C 13/0007

OTHER PUBLICATIONS

Gogotsi, Y., "Chemical Vapour Deposition: Transition Metal Carbides Go 2D." Nature Materials, 14 (11), 3 pages.

(Continued)

*Primary Examiner* — Tha-O H Bui
(74) *Attorney, Agent, or Firm* — Perkins Coie LLP

(57) ABSTRACT

A semiconductor device may include: a first conductive line; a second conductive line disposed over the first conductive line and spaced apart from the first conductive line; a memory cell disposed between the first conductive line and the second conductive line and including a memory layer; and one or more shield layers disposed at least one of at a first location over the memory layer or a second location under the memory layer, the one or more shield layers including an MXene material.

24 Claims, 22 Drawing Sheets

(56) References Cited

U.S. PATENT DOCUMENTS

2019/0166733 A1* 5/2019 Gogotsi ............... H05K 9/0084
2020/0388753 A1* 12/2020 Karpov ............. G11C 13/0097

OTHER PUBLICATIONS

Han, M. et al., "Beyond Ti3C2T: MXenes for Electromagnetic Interference Shielding." ACS Nano 2020, 14, 9 pages.

Iqbal, A. et al., Anomalous absorption of electromagnetic waves by 2D transition metal carbonitride Ti3CNTx (MXene). Science, 369, Jul. 24, 2020, 5 pages.

Jiang, X. et al., "Two-dimensional MXenes: From morphological to optical electric, and magnetic properties and applications." Physics Reports 848 (2020), 58 pages.

Lei, J. et al., "Predicting stable phase monolayer Mo2C (MXene), a superconductor with chemically-tunable critical temperature." Journal of Materials Chemistry C, May 2017, 7 pages.

Naik, V.B. et al., "STT-MRAM: A Robust Embedded Non-Volatile Memory with Superior Reliability and Immunity to External Magnetic Field and RF Sources." GLOBALFOUNDRIES, Singapore. 2021 Symposium on VLSI Technology Digest of Technical Papers, 2 pages.

Ohuchida, S. et al., "Model of inter-cell interference phenomenon in 10 nm magnetic tunnel junction with perpendicular anisotropy array due to oscillatory stray field from neighboring cells." Japanese Journal of Applied Physics, 57, 2018, 7 pages.

Roberto Dos Santos Politi, J. et al., "Atomic and electronic structure of molybdenum carbide phases: bulk and low Miller-index surfaces." Phys. Chem. Chem. Phys., 2013, 15, 12617, 9 pages.

Shahzad, F. et al., "Electromagnetic interference shielding with 2D transition metal carbides (MXenes)." Science, vol. 353, Issue 6304, Sep. 9, 2016, 4 pages.

Song, P. et al., "MXenes for polymer matrix electromagnetic interference shielding composites: A review." Composites Communications 24 (2021), 13 pages.

Yorulmaz, U. et al., "A systematical ab-initio review of promising 2D MXene monolayers towards Li-ion battery applications." Journal of Physics: Energy, 2 (2020), 16 pages.

Zhou, B. et al., "Flexible MXene/Silver Nanowire-Based Transparent Conductive Film with Electromagnetic Interference Shielding and Electro-Photo-Thermal Performance." ACS Applied Materials & Interfaces, 2020 American Chemical Society, 11 pages.

* cited by examiner

SEMICONDUCTOR DEVICE INCLUDING SHIELD LAYER

PRIORITY CLAIM AND CROSS-REFERENCE TO RELATED APPLICATION

This patent document claims the priority and benefits of Korean Patent Application No. 10-2022-0074228 filed on Jun. 17, 2022, which is incorporated herein by reference in its entirety.

TECHNICAL FIELD

This patent document relates to memory circuits or devices and their applications in semiconductor devices or systems.

BACKGROUND

The recent trend toward miniaturization, low power consumption, high performance, and multi-functionality in the electrical and electronics industry has compelled the semiconductor manufacturers to focus on high-performance, high capacity semiconductor devices. Examples of such high-performance, high capacity semiconductor devices include memory devices that can store data by switching between different resistance states according to an applied voltage or current. The semiconductor devices may include an RRAM (resistive random access memory), a PRAM (phase change random access memory), an FRAM (ferroelectric random access memory), an MRAM (magnetic random access memory), and an electronic fuse (E-fuse).

SUMMARY

The disclosed technology in this patent document relates to memory circuits or devices and their applications in semiconductor devices or systems. Various implementations of a semiconductor device can improve the performance of a semiconductor device and reduce manufacturing defects.

In one aspect, a semiconductor device for implementing the disclosed technology may include: a first conductive line; a second conductive line disposed over the first conductive line and spaced apart from the first conductive line; a memory cell disposed between the first conductive line and the second conductive line and including a memory layer; and one or more shield layers disposed at least one of at a first location over the memory layer or a second location under the memory layer, the one or more shield layers including an MXene material.

In another aspect, a semiconductor device for implementing the disclosed technology may include: a plurality of memory cells disposed over a substrate, each of the plurality of memory cells including a memory layer; an encapsulation layer disposed to encapsulate each of the plurality of memory cells; and a shield layer disposed over the encapsulation layer and including an MXene material.

In some implementations, the memory cell may be configured to exhibit different electrical resistance states for storing data. The MXene material may correspond to a compound material that includes transition metal layers bounded to carbon and/or nitrogen with each external transition metal layer bounded to a surface terminating functional group.

The above and other aspects of the disclosed technology are disclosed in the drawings, the detailed description and the claims.

DETAILED DESCRIPTION

Figure 1A:
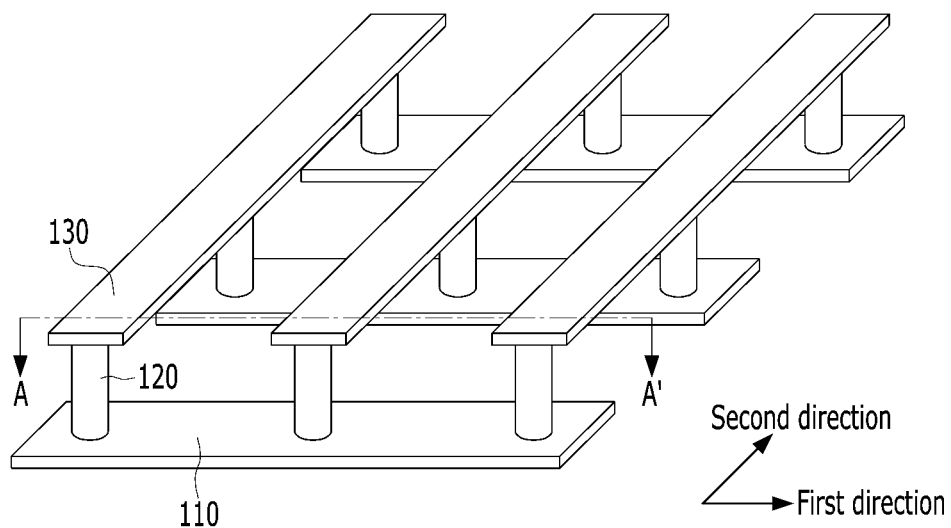
FIGS. 1A and 1B illustrate an example of a semiconductor device based on some implementations of the disclosed technology.

Hereinafter, various embodiments of the disclosure will be described in detail with reference to the accompanying drawings.

The drawings are not necessarily drawn to scale. In some instances, proportions of at least some structures in the drawings may have been exaggerated in order to clearly illustrate certain features of the described embodiments. In presenting a specific example in a drawing or description having two or more layers in a multi-layer structure, the relative positioning relationship of such layers or the sequence of arranging the layers as shown reflects a particular implementation for the described or illustrated example and a different relative positioning relationship or sequence of arranging the layers may be possible. In addition, a described or illustrated example of a multi-layer structure might not reflect all layers present in that particular multilayer structure (e.g., one or more additional layers may be present between two illustrated layers). As a specific example, when a first layer in a described or illustrated multi-layer structure is referred to as being "on" or "over" a second layer or "on" or "over" a substrate, the first layer may be directly formed on the second layer or the substrate but may also represent a structure where one or more other intermediate layers may exist between the first layer and the second layer or the substrate.

Figure 1B:
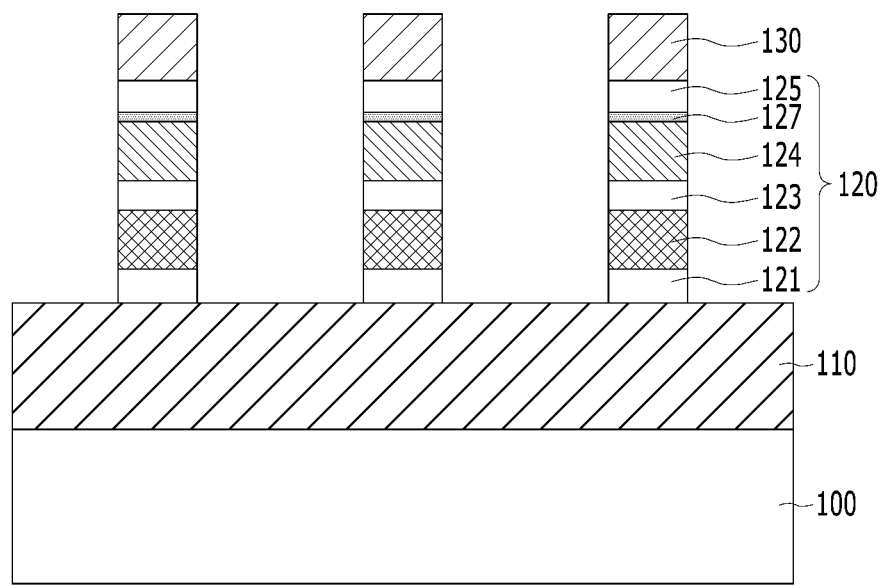

FIGS. 1A and 1B illustrate a semiconductor device based on some implementations of the disclosed technology. FIG. 1A is a perspective view, and FIG. 1B is a cross-sectional view taken along line A-A' of FIG. 1A.

Referring to FIGS. 1A and 1B, the semiconductor device may include a cross-point structure including a substrate 100, first conductive lines 110 formed over the substrate 100 and extending in a first direction, second conductive lines 130 formed over the first conductive lines 110 to be spaced apart from the first conductive lines 110 and extending in a second direction crossing the first direction, and memory cells 120 disposed at intersections of the first conductive lines 110 and the second conductive lines 130 between the first conductive lines 110 and the second conductive lines 130. In this patent document, the conductive lines can indicate conductive structures that electrically connect two or more circuit elements in the semiconductor memory. In some implementations, the conductive lines include word lines that are used to control access to memory cells in the memory device and bit lines that are used to read out information stored in the memory cells. In some implementations, the conductive lines include interconnects that carry signals between different circuit elements in the semiconductor memory.

The substrate 100 may include a semiconductor material such as silicon. A required lower structure (not shown) may be formed in the substrate 100. For example, the substrate 100 may include a driving circuit (not shown) electrically connected to the first conductive lines 110 and/or the second conductive lines 130 to control operations of the memory cells 120. In this patent document, the conductive lines can indicate conductive structures that electrically connect two or more circuit elements in the semiconductor device. In some implementations, the conductive lines include word lines that are used to control access to memory cells in the memory device and bit lines that are used to read out information stored in the memory cells. In some implementations, the conductive lines include interconnects that carry signals between different circuit elements in the semiconductor device.

The first conductive lines 110 and the second conductive lines 130 may be connected to a lower end and an upper end of the memory cell 120, respectively, and may provide a voltage or a current to the memory cell 120 to drive the memory cell 120. When the first conductive lines 110 functions as a word line, the second conductive lines 130 may function as a bit line. Conversely, when the first conductive lines 110 functions as a bit line, the second conductive lines 130 may function as a word line. The first conductive lines 110 and the second conductive lines 130 may include a single-layered structure or a multi-layered structure including one or more of various conductive materials. Examples of the conductive materials may include a metal, a metal nitride, or a conductive carbon material, or a combination thereof, but are not limited thereto. For example, the first conductive lines 110 and the second conductive lines 130 may include tungsten (W), titanium (Ti), tantalum (Ta), platinum (Pt), aluminum (Al), copper (Cu), zinc (Zn), nickel (Ni), cobalt (Co), lead (Pb), tungsten nitride (WN), tungsten silicide (WSi), titanium nitride (TiN), titanium silicon nitride (TiSiN), titanium aluminum nitride (TiAlN), tantalum nitride (TaN), tantalum silicon nitride (TaSiN), tantalum aluminum nitride (TaAlN), carbon (C), silicon carbide (SiC), or silicon carbon nitride (SiCN), or a combination thereof.

The memory cell 120 may be arranged in a matrix having rows and columns along the first direction and the second direction so as to overlap the intersection regions between the first conductive lines 110 and the second conductive lines 130. In an implementation, each of the memory cells 120 may have a size that is substantially equal to or smaller than that of the intersection region between each corresponding pair of the first conductive lines 110 and the second conductive lines 130. In another implementation, each of the memory cells 120 may have a size that is larger than that of the intersection region between each corresponding pair of the first conductive lines 110 and the second conductive lines 130.

Spaces between the first conductive lines 110, the second conductive lines 130 and the memory cell 120 may be filled with an insulating material.

The memory cell 120 may include a stacked structure including a lower electrode layer 121, a selector layer 122, a middle electrode layer 123, a memory layer 124, a shield layer 127 and an upper electrode 125.

The memory layer 124 may be used to store data by switching between different resistance states according to an applied voltage or current. The memory layer 124 may have a single-layered structure or a multi-layered structure including at least one of materials having a variable resistance characteristic used for an RRAM, a PRAM, an MRAM, an FRAM, and others. For example, the memory layer 124 may include a metal oxide such as a transition metal oxide or a perovskite-based oxide, a phase change material such as a chalcogenide-based material, a ferromagnetic material, a ferroelectric material, or others. In some implementations, the memory layer 124 may include a magnetic tunnel junction (MTJ) structure. However, the implementations are not limited thereto, and the memory cell 120 may include other memory layers capable of storing data in various ways instead of the memory layer 124.

The selector layer 122 may serve to control access to the memory layer 124 and prevent a current leakage between the memory cells 120 sharing the first line 110 or the second line 130. To this end, the selector layer 122 may have a threshold switching characteristic that blocks or substantially limits a current when a magnitude of an applied voltage is less than a predetermined threshold value and allows the current to increase rapidly when the magnitude of the applied voltage is equal to or greater than the predetermined threshold value. This threshold value may be referred to as a threshold voltage, and the selector layer 122 may controlled to be in either a turned-on or "on" state to be electrically conductive or a turned-off or "off" state to be electrically less-conductive than the "on" state or electrically non-conductive depending on whether the applied voltage is above or below the threshold voltage. Thus, the selector layer 122 exhibits different electrically conductive states to provide a switching operation to switch between the different electrically conductive states by controlling the applied voltage relative to the threshold voltage. The selector layer 122 may include Metal Insulator Transition (MIT) material such as $NbO_2$, $TiO_2$, $VO_2$, $WO_2$, or others, Mixed Ion-Electron Conducting (MIEC) material such as $ZrO_2(Y_2O_3)$, $Bi_2O_3$—BaO, $(La_2O_3)_x(CeO_2)_{1-x}$, or others, Ovonic Threshold Switching (OTS) material including chalcogenide material such as $Ge_2Sb_2Te_5$, $As_2Te_3$, $As_2$, $As_2Se_3$, or others, or a tunneling insulating material such as silicon oxide, silicon nitride, a metal oxide, or others. A thickness of the tunneling insulating layer is sufficiently small to allow tunneling of electrons through the tunneling insulating layer under a given voltage or a given current. The selector layer 122 may include a single-layered structure or a multi-layered structure.

In some implementations, the selector layer 122 may perform a threshold switching operation through a doped region formed in a material layer for the selector layer 122. Thus, a size of the threshold switching operation region may be controlled by a distribution area of the dopants. The dopants may form trap sites for charge carriers in the material layer for the selector layer 122. The trap sites may capture the charge carriers moving in the selector layer 122 based on an external voltage applied to the selector layer

122. The trap sites thereby provide a threshold switching characteristic and are used to perform a threshold switching operation.

In some implementations, the selector layer 122 may include a dielectric material having incorporated dopants. The selector layer 122 may include an oxide with dopants, a nitride with dopants, or an oxynitride with dopants, or a combination thereof such as silicon oxide, titanium oxide, aluminum oxide, tungsten oxide, hafnium oxide, tantalum oxide, niobium oxide, silicon nitride, titanium nitride, aluminum nitride, tungsten nitride, hafnium nitride, tantalum nitride, niobium nitride, silicon oxynitride, titanium oxynitride, aluminum oxynitride, tungsten oxynitride, hafnium oxynitride, tantalum oxynitride, or niobium oxynitride, or a combination thereof. The dopants doped into the selector layer 122 may include an n-type dopant or a p-type dopant and be incorporated for example, by ion implantation process. Examples of the dopants may include one or more of boron (B), nitrogen (N), carbon (C), phosphorous (P), arsenic (As), aluminum (Al), silicon (Si) or germanium (Ge). For example, the selector layer 122 may include As-doped silicon oxide or Ge-doped silicon oxide.

The lower electrode layer 121 may be interposed between the first conductive line 110 and the selector layer 122 and disposed at a lowermost portion of each of the memory cells 120. The lower electrode layer 121 may function as a circuit node that carries a current or applies a voltage between one of the first conductive lines 110 and the remaining portion (e.g., the elements 122, 123, 124, 127 and 125) of each of the memory cells 120. The middle electrode layer 123 may be interposed between the selector layer 122 and the memory layer 124. The middle electrode layer 123 may electrically connect the selector layer 122 and the memory layer 124 to each other while physically isolating or separating the selector layer 122 and the memory layer 124 from each other. The upper electrode layer 125 may be disposed at an uppermost portion of the memory cell 120 and function as a transmission path of electrical signals such as a voltage or a current between a material layer in the memory cell 120 and one of the second conductive lines 130. At least one of the lower electrode layer 121, the middle electrode layer 123, and the upper electrode layer 125 can be omitted.

The lower electrode layer 121, the middle electrode layer 123 and the upper electrode layer 125 may include a single-layered structure or a multi-layered structure including various conductive materials such as a metal, a metal nitride, a conductive carbon material, or a combination thereof, respectively. For example, the lower electrode layer 121, the middle electrode layer 123 and the upper electrode layer 125 may include tungsten (W), titanium (Ti), tantalum (Ta), platinum (Pt), aluminum (Al), copper (Cu), copper (Cu), zinc (Zn), nickel (Ni), cobalt (Co), lead (Pb), tungsten nitride (WN), tungsten silicide (WSi), titanium nitride (TiN), titanium silicon nitride (TiSiN), titanium aluminum nitride (TiAlN), tantalum nitride (TaN), tantalum silicon nitride (TaSiN), tantalum aluminum nitride (TaAlN), carbon (C), silicon carbide (SiC), or silicon carbon nitride (SiCN), or a combination thereof.

The lower electrode layer 121 and the upper electrode layer 125 may include the same material as each other or different materials from each other.

The lower electrode layer 121 and the upper electrode layer 125 may have the same thickness as each other or different thicknesses from each other.

The shield layer 127 can exhibit high electromagnetic interference (EMI) shielding efficiency to effectively protect the memory layer 124 from external EMI.

Usually, the memory element may be vulnerable to external EMI. For example, the MTJ included in the memory layer 124 may be affected by a stary magnetic field from an adjacent cell and an external magnetic field. Further, an inter-cell stray magnetic field may generate EMI to reduce a margin between operating distributions. Under this circumstance, in order to secure the operation reliability, there has been a need for a shielding means or structure for protecting the device from EMI. The desired characteristics for a shielding means or structure may include exhibiting a high EMI shielding efficiency and electrical conductivity that does not interfere with the operation of the device. Further, when the shielding means or structure is formed as a layer included in the device, it is desirable to be formed as a uniform layer with low roughness. Conventionally, metal materials such as silver and copper have been mainly used as the shielding means. However, these metal materials have disadvantages such as high density and high manufacturing cost. Further, these metal materials are heavy, prone to corrosion and difficult to process.

In recognition of the problems above and order to overcome these problems, in implementations of the disclosed technology, memory cell 120 may include the shield layer 127 formed of or include an MXene material.

The MXene materials are a class of two-dimensional inorganic compounds. These materials include or consist of a-few-atoms-thick layers of transition metal bounded to carbon and/or nitrogen. That is, the MXene material is a two-dimensional transition metal carbide and/or nitride. The MXene material may further include a surface terminating functional group such as O, OH, F and/or Cl bounded to each external transition metal layer. When the MXene material has O or OH surface terminating functional group, the MXene materials can exhibit both the metallic conductivity of transition metal and a hydrophilic nature because of their hydroxyl- or oxygen-terminated surfaces.

Because the surfaces of the MXene material may be terminated by functional groups, the MXene material may be represented by the formula: $M_{n+1}X_nT_x$ and have a structure in which n carbon or nitrogen layers (X) are inserted into n+1 (n=1 to 3) transition metal (M) layers $T_x$ is surface terminating functional groups such as O, OH, F and/or Cl bounded to an external M layer. The transition metal layers can include, in some implementations, early transition metals in Groups 3 through 7 of the d-block of the periodic table. The atomic schematics of the MXene material may be represented by $M_2XT_x$, $M_3X2T_x$ and $M_4X3T_x$. Unlike most ceramic materials, the MXene materials have excellent electrical conductivity, remarkable EMI shielding efficiency and superior energy storage characteristics. These excellent characteristics of the MXene materials may be due to the chemical composition including or consisting of transition metals and nitrogen or carbon and the structural characteristics of a sheet of two-dimensional molecules. For example, $Ti_3C_2$ of about 55 nm is known to exhibit about 99% EMI shielding efficiency.

In implementations of the disclosed technology, the shield layer 127 is formed of or include the MXene material so that EMI from external sources and interference from a stray magnetic field from an adjacent memory cell 120 can be shielded with high efficiency. Therefore, it is possible to improve the performance of the semiconductor device. In addition, since the shield layer 127 is formed as a thin and uniform layer that does not interfere with the structure of the semiconductor device and has electrical conductivity that does not interfere with the operation of the memory cell 120, it is possible to further improve the performance of the semiconductor device. Further, the shield layer 127 is lighter than the metal materials and may be formed at low cost.

In some implementations, the shield layer 127 may include at least one of $Sc_2C$, $Ti_2C$, $Ti_2N$, $Zr_2C$, $Zr_2N$, $Hf_2C$, $Hf_2N$, $V_2C$, $V_2N$, $Nb_2C$, $Ta_2C$, $Cr_2C$, $Cr_2N$, $Mo_2C$, $Mo_{1.3}C$, $Cr_{1.3}C$, $(Ti, V)_2C$, $(Ti, Nb)_2C$, $W_2C$, $W_{1.3}C$, $Mo_2N$, $Nb_{1.3}C$, $Mo_{1.3}Y_{0.6}C$, $Ti_3C_2$, $Ti_3N_2$, $Ti_3(CN)$, $Zr_3C_2$, $(Ti, V)_3C_2$, $(Ti_2Nb)C_2$, $(Ti_2Ta)C_2$, $(Ti_2Mn)C_2$, $Hf_3C_3$, $(Hf_2V)C_2$, $(Hf_2Mn)C_2$, $(V_2Ti)C_2$, $(Cr_2Ti)C_2$, $(Cr_2V)C_2$, $(Cr_2Nb)C_2$, $(Cr_2Ta)C_2$, $(Mo_2Sc)C_2$, $(Mo_2Ti)C_2$, $(Mo_2Zr)C_2$, $(Mo_2Hf)C_2$, $(Mo_2V)C_2$, $(Mo_2Nb)C_2$, $(Mo_2Ta)C_2$, $(W_2Ti)C_2$, $(W_2Zr)C_2$, $(W_2Hf)C_2$, $Ti_4N_3$, $V_4C_3$, $Nb_4C_3$, $Ta_4C_3$, $(Ti, Nb)_4C_3$, $(Nb, Zr)_4C_3$, $(Ti_2Nb_2)C_3$, $(Ti_2Ta_2)C_3$, $(V_2Ti_2)C_3$, $(V_2Nb_2)C_3$, $(V_2Ta_2)C_3$, $(Nb_2Ta_2)C_3$, $(Cr_2Ti_2)C_3$, $(Cr_2V_2)C_3$, $(Cr_2Nb_2)C_3$, $(Cr_2Ta_2)C_3$, $(Mo_2Ti_2)C_3$, $(Mo_2Zr_2)C_3$, $(Mo_2Hf_2)C_3$, $(Mo_2V_2)C_3$, $(Mo_2Nb_2)C_3$, $(Mo_2Ta_2)C_3$, $(W_2Ti_2)C_3$, $(W_2Zr_2)C_3$, or $(W_2Hf_2)C_3$. In some implementations, the shield layer 127 may include a combination among at least two of the above-mentioned materials. The surfaces of the above compounds may be terminated by functional groups such as O, OH, F and/or Cl.

The MXene material may be formed by known methods such as a selective etching process, a chemical transformation process, a bottom-up construction process, or others.

The selective etching process is a method using a crystalline material called a MAX phase as a precursor. The MAX phase represents a carbide or a nitride having a layered hexagonal structure and the formula: $M_{n+1}AX_n$, where M is an early transition metal, A is an element from group 13 or 14 of the periodic table, X is C and/or N, and n=1-4. Hundreds of different MXene materials may exist by various combinations of M, A and X. The MXene materials having a structure of $M_4X3$, $M_3X_2$ or $M_2X$ may be formed by selectively etching out the A element from the MAX phase having a structure of $M_4AX_3$, $M_3AX_2$ or $M_2AX$. Examples of the selective etching process may include a wet etching process using an acid, a wet etching process without using an acid, a molten-slat etching process, or others.

The chemical transformation process may include ammoniation of transition metal carbides by reacting them with ammonia to form an MXene material, carburization by introducing carbon into the surface of transition metal sulfides to form an MXene material, and deoxygenation and carburization.

Examples of the bottom-up construction process may include chemical vapor deposition (CVD), physical vapor deposition (PVD), atomic layer deposition (ALD), salt-templated growth, or others.

In implementations of the disclosed technology, the shield layer 127 including the MXene material may be formed by selecting an appropriate method among these known methods. For example, the shield layer 127 may be formed by a deposition method such as CVD, PVD, ALD, or others.

In some implementations, each of the memory cells 120 includes the lower electrode layer 121, the selector layer 122, the middle electrode layer 123, the memory layer 124, the shield layer 127 and the upper electrode layer 125 which are sequentially stacked. The structures of the memory cells 120 may be varied without being limited to one as shown in FIGS. 1A and 1B as long as the memory cells 120 have data storage properties. In some implementations, at least one of the lower electrode layer 121, the middle electrode layer 123 and the upper electrode layer 126 may be omitted. For example, when the lower electrode layer 121 is omitted, the first conductive lines 110 may perform the function of the lower electrode layer 121. When the upper electrode layer 126 is omitted, the second conductive lines 130 may perform the function of the upper electrode layer 126. In some implementations, the relative position of the memory layer 124 and the selector layer 122 may be reversed. In some implementations, in addition to the layers 121, 122, 123, 124, 125 and 127 shown in FIG. 1B, the memory cells 120 may further include one or more layers (not shown) for enhancing characteristics of the memory cells 120 or improving fabricating processes.

In some implementations, neighboring memory cells of the plurality of memory cells 120 may be spaced apart from each other at a predetermined interval, and trenches may be present between the plurality of memory cells 120. A trench between neighboring memory cells 120 may have a height to width ratio (i.e., an aspect ratio) in a range from 1:1 to 40:1, from 10:1 to 40:1, from 10:1 to 20:1, from 5:1 to 10:1, from 10:1 to 15:1, from 1:1 to 25:1, from 1:1 to 30:1, from 1:1 to 35:1, or from 1:1 to 45:1.

In some implementations, the trench may have sidewalls that are substantially perpendicular to an upper surface of the substrate 100. In some implementations, neighboring trenches may be spaced apart from each other by an equal or similar distance.

Although one cross-point structure has been described, two or more cross-point structures may be stacked in a vertical direction perpendicular to a top surface of the substrate 100.

A method for fabricating a semiconductor device will be explained with reference to FIGS. 2A and 2B. The detailed descriptions similar to those described in FIGS. 1A and 1B will be omitted.

Figure 2A:
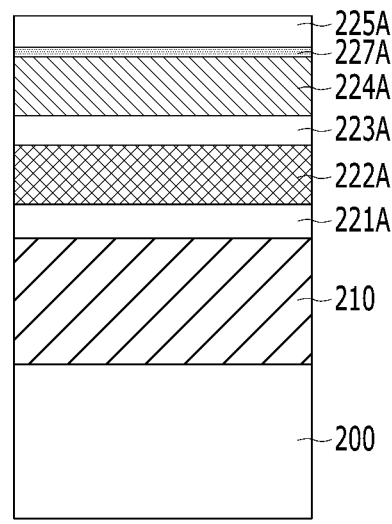
FIGS. 2A and 2B are cross-sectional views illustrating an example method for fabricating a semiconductor device based on some implementations of the disclosed technology.

Referring to FIG. 2A, first conductive lines 210 may be formed over a substrate 200 in which a predetermined structure is formed. For example, the first conductive lines 210 may be formed by forming a conductive layer for the first conductive lines 210 and etching the conductive layer using a mask pattern in a line shape extending in a first direction. The first conductive lines 210 may have a single-layered structure or a multi-layered structure including a conductive material.

Then, a material layer 221A for forming a lower electrode layer, a material layer 222A for forming a selector layer, a material layer 223A for forming a middle electrode layer, a material layer 224A for forming a memory layer, a material layer 227A for forming a shield layer and a material layer 225A for forming an upper electrode layer may be sequentially formed over the first conductive lines 210.

The material layer 221A may have a single-layered structure or a multi-layered structure including various conductive materials such as a metal, a metal nitride, a conductive carbon material, or a combination thereof.

The material layer 222A may include an MIT material, and MIEC material, an OTS material including a chalcogenide-based material, a tunneling insulating material, a doped insulating material, or others.

The material layer 223A may have a single-layered structure or a multi-layered structure including various conductive materials such as a metal, a metal nitride, a conductive carbon material, or a combination thereof.

The material layer 224A may include materials used for an RRAM, a PRAM, an FRAM, an MRAM, and others, for example materials having a variable resistance characteristic used for the RRAM, the PRAM, the FRAM, the MRAM, and others. For example, the material layer 224A may include an MTJ structure.

The material layer 227A may include an MXene material. In some implementations, the material layer 227A may be formed by known method for forming the MXene material, for example, a deposition method such as CVD, PVD, ALD, or others.

The material layer 227A may be formed as a uniform layer having a low roughness and a very small thickness.

The material layer 225A may have a single-layered structure or a multi-layered structure including various conductive materials such as a metal, a metal nitride, a conductive carbon material, or a combination thereof.

Figure 2B:
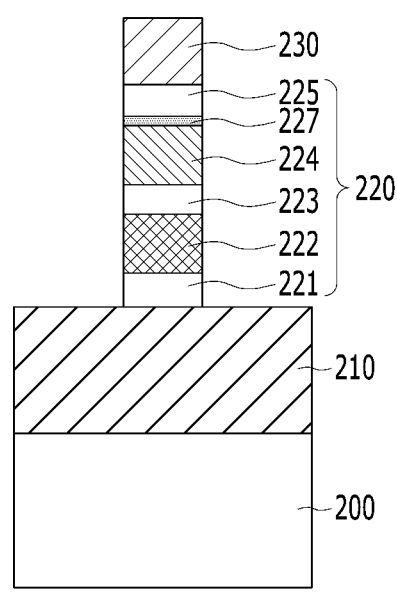

Referring to FIG. 2B, a lower electrode layer 221, a selector layer 222, a middle electrode layer 223, a memory layer 224, a shield layer 227 and an upper electrode layer 225 may be formed by sequentially etching the material layer 225A, the material 227A, the material layer 224A, the material layer 223A, the material layer 222A and the material layer 221A through a patterning process using a mask pattern (not shown).

Here, the patterning process may be performed, for example, by an IBE process.

In the implementation, the upper electrode layer 225 is simultaneously etched in the pattering process for etching the memory layer 224. In another implementation, the upper electrode layer 225 may be etched by a separate patterning process from the patterning process for the memory layer 224.

The second conductive lines 230 may be formed by forming a conductive layer for forming the second conductive lines 230 and etching the conductive layer using a mask pattern in a line shape extending in a second direction. The second conductive lines 230 may include a single-layered structure or a multi-layered structure including one or more of various conductive materials.

The semiconductor device formed by the method described in FIGS. 2A and 2B may include the substrate 200, the first conductive lines 210, a memory cell 220 and the second conductive lines 230. The memory cell 220 may include the lower electrode layer 221, the selector layer 222, the middle electrode layer 223, the memory layer 224, the shield layer 227 and the upper electrode layer 225 which are sequentially stacked. The shield layer 227 may include the MXene material and be formed as a uniform layer having low roughness and a small thickness. The shield layer 227 may have a thickness that is sufficiently thin to prevent the shield layer 227 from affecting the structure of the semiconductor device and interfering operations of the semiconductor device.

According to the implementations, since the thin and uniform shield layer 227 including the MXene material is formed over the memory layer 224, EMI from external sources and a stray magnetic field from an adjacent memory cell 220 can be shielded with high efficiency. Further, the shield layer 227 having a thin thickness does not affect the structure of the semiconductor device, thereby improving the operational reliability of the device.

In some implementations, the semiconductor device in accordance with the implementation includes the lower electrode layer 221, the middle electrode layer 223 and the upper electrode layer 225. In another implementation, at least one of the lower electrode layer 221, the middle electrode layer 223 and the upper electrode layer 225 may be omitted.

In some implementations, the variable resistance layer 224 is disposed over the selector layer 222. In another implementation, the variable resistance layer 224 may be disposed under the selector layer 222.

The substrate 200, the first conductive lines 210, the memory cell 220, the lower electrode layer 221, the selector layer 222, the middle electrode layer 223, the memory layer 224, the shield layer 227, the upper electrode layer 225 and the second conductive lines 230 shown in FIG. 2B may correspond to the substrate 100, the first conductive lines 110, the memory cell 120, the lower electrode layer 121, the selector layer 122, the middle electrode layer 123, the memory layer 124, and the shield layer 127, the upper electrode layer 125 and the second conductive lines 130 shown in FIG. 1B.

Figure 3A:
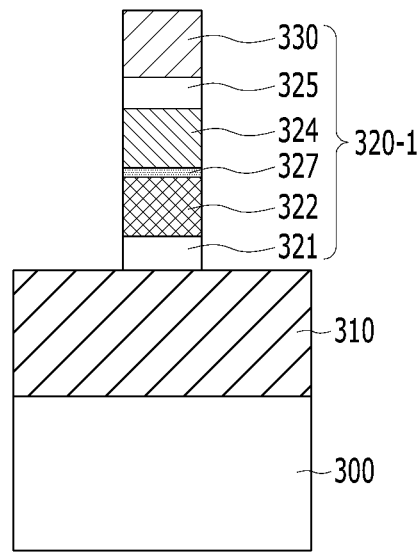
FIGS. 3A and 3B illustrate another example of a semiconductor device based on some implementations of the disclosed technology.
Figure 3B:
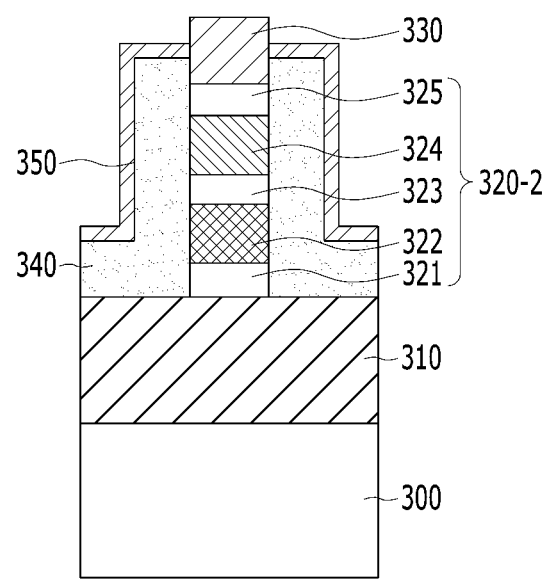

FIGS. 3A and 3B illustrate another example of a semiconductor device based on some implementations of the disclosed technology.

The implementation shown in FIG. 3A may be similar to the implementations shown in FIGS. 1B and 2B except that a shield layer 327 including an MXene material is formed under a memory layer 324 and a middle electrode layer is omitted. The descriptions similar to those described in the implementations shown in FIGS. 1B and 2B will be omitted.

Referring to FIG. 3A, the semiconductor device may include a substrate 300, first conductive lines 310, a memory cell 320-1 and second conductive lines 330. The memory cell 320-1 may include a lower electrode layer 321, a selector layer 322, a shield layer 327, a memory layer 324 and an upper electrode layer 325 which are sequentially stacked. The shield layer 327 may include the MXene material and be formed as a uniform layer having low roughness and a small thickness. The shield layer 327 may have a thickness that is sufficiently thin to prevent the shield layer 327 from affecting the structure of the semiconductor device and interfering operations of the semiconductor device.

According to the implementations, since the thin and uniform shield layer 327 including the MXene material is formed below the memory layer 324, EMI from external sources and a stray magnetic field from an adjacent memory cell 320-1 can be shielded with high efficiency. Further, the shield layer 327 having a thin thickness does not affect the structure of the semiconductor device, thereby improving the operational reliability of the device.

In some implementations, the semiconductor device in accordance with the implementation includes the lower electrode layer 321 and the upper electrode layer 325. In another implementation, at least one of the lower electrode layer 321 and the upper electrode layer 325 may be omitted. In another implementation, a middle electrode layer may be formed between the shield layer 327 and the selector layer 322.

In some implementation, the memory layer 324 is disposed over the selector layer 322. In another implementation, the memory layer 324 may be disposed under the selector layer 322.

The implementation shown in FIG. 3B is similar to the implementations shown in FIGS. 1B and 2B except that a shield layer 350 including an MXene material is formed over an encapsulation layer 340 for encapsulating the semiconductor device. The detailed descriptions similar to those described in the implementations shown in FIGS. 1B and 2B will be omitted.

Referring to FIG. 3B, the semiconductor device may include a substrate 300, first conductive lines 310, a memory cell 320-2, second conductive lines 330, the encapsulation layer 340 and the shield layer 350. The memory cell 320-2 may include a lower electrode layer 321, a selector layer 322, a middle electrode layer 323, a memory layer 324 and an upper electrode layer 325.

The encapsulation layer 340 may serve to protect the memory cell 320-2 by encapsulating the memory cell 320-2.

The encapsulation layer 340 may be formed to surround side surfaces of the memory cell 320-2 and a surface of the first conductive lines 310. The encapsulation layer 340 may include an insulating material. The insulating material may include an oxide, a nitride, or a combination thereof. For example, the encapsulation layer 340 may include SiO2, SiN4, SiOCN, SiON, or a combination thereof.

The encapsulation layer 340 may be formed to have a thickness equal to or greater than a predetermined thickness in order to control damage of the memory layer 324 during forming the second conductive lines 330.

The shield layer 350 may be conformally formed over the encapsulation layer 340. The shield layer 150 may include the MXene material and be formed as a uniform layer having low roughness and a small thickness.

The semiconductor device in accordance with the implementation may be formed by the following method. First, the memory cell 320-2 may be formed by forming the first conductive lines 310 over the substrate 300, forming material layers for forming the memory cell 320-2 and etching the material layers. Then, the encapsulation layer 340 including the insulating material may be conformally formed over the resultant structure. Then, the shield layer 350 including the MXene material may be conformally formed over the encapsulation layer 340. Then, the second conductive lines 330 may be formed by forming a conductive layer for forming the second conductive lines 330 and etching the conductive layer using a mask pattern in a line shape extending in a second direction. During forming the second conductive lines 330, a portion of the shield layer 350 and a portion of the encapsulation layer 340 disposed over the upper electrode layer 325 may be removed.

According to the implementations, since the shield layer 350 including the MXene material is formed over the encapsulation layer 340 for encapsulating the memory cell 320-2, the semiconductor device may have a double-layer structure including an internal insulating layer and an external electrically conductive MXene material layer. This double-layer structure can protect the memory cell 320-2 more effectively. Further, EMI from external sources and a stray magnetic field from an adjacent memory cell 320-2 can be shielded with high efficiency. Moreover, the shield layer 327 having a thin thickness does not affect the structure of the semiconductor device, thereby improving the operational reliability of the device.

In some implementations, the semiconductor device in accordance with the implementation includes the lower electrode layer 321, the middle electrode layer 323 and the upper electrode layer 325. In another implementation, at least one of the lower electrode layer 321, the middle electrode layer 323 and the upper electrode layer 325 may be omitted.

In some implementations, the memory layer 324 is disposed over the selector layer 322. In another implementation, the memory layer 324 may be disposed under the selector layer 322.

Figure 4A:
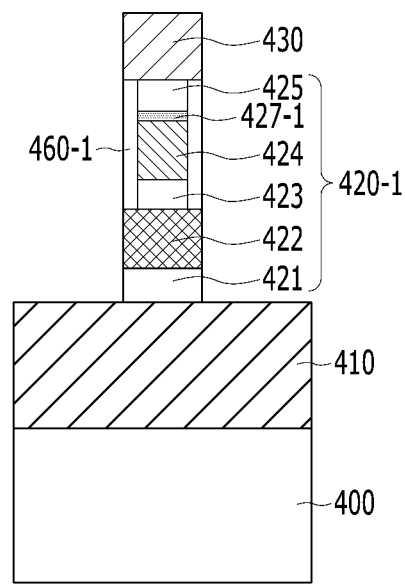
FIGS. 4A to 4C illustrate another example of a semiconductor device based on some implementations of the disclosed technology.
Figure 4B:
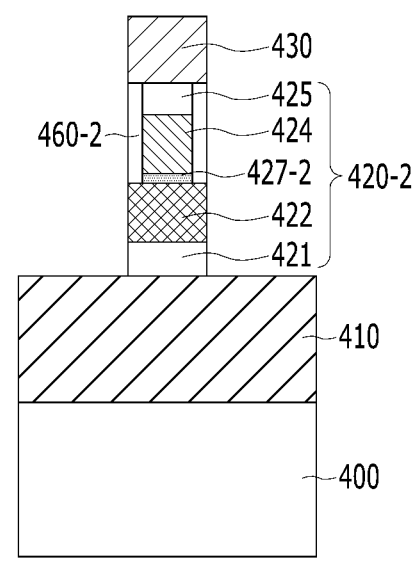
Figure 4C:
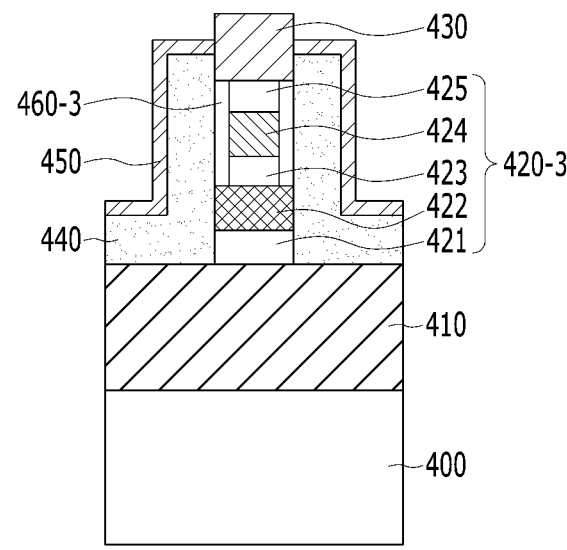

FIGS. 4A to 4C illustrate another example of a semiconductor device based on some implementations of the disclosed technology.

The implementations shown in FIGS. 4A to 4C may be similar to the implementation shown in FIGS. 1B, 2B, 3A and 3B, respectively, except that the semiconductor device further includes sidewall spacer layers 460-1, 460-2 and 460-3. The descriptions similar to those described in the implementations shown in FIGS. 1B, 2B, 3A and 3B will be omitted.

Referring to FIG. 4A, the semiconductor device may include a substrate 400, first conductive lines 410, a memory cell 420-1, second conductive lines 430 and the sidewall spacer layer 460-1. The memory cell 420-1 may include a lower electrode layer 421, a selector layer 422, a middle electrode layer 423, a memory layer 424, a shield layer 427-1 and an upper electrode layer 425.

The shield layer 427-1 may be formed between the memory layer 424 and the upper electrode layer 425. The shield layer 427-1 may include the MXene material and be formed as a uniform layer having low roughness and a small thickness. Thus, it is possible to prevent the shield layer 427-1 from affecting the structure of the semiconductor device and interfering operations of the semiconductor device.

The sidewall spacer layer 460-1 may be formed on sidewalls of the middle electrode layer 423, the memory layer 424, the shield layer 427-1 and the upper electrode layer 425. The sidewall spacer layer 460-1 may include an insulating material. The insulating material may include an oxide, a nitride, or a combination thereof.

The semiconductor device in accordance with the implementation may be formed by the following method.

First, the first conductive lines 410 may be formed over the substrate 400 and a material layer for forming the lower electrode layer 421 and a material layer for forming the selector layer 422 may be sequentially formed over the first conductive lines 410. Then, the middle electrode layer 423, the memory layer 424, the shield layer 427-1 and the upper electrode layer 425 may be formed over the material layer for forming the selector layer 422. The middle electrode layer 423, the memory layer 424, the shield layer 427-1 and the upper electrode layer 425 may be formed by sequentially forming a material layer for forming the middle electrode layer 423, a material layer for forming the memory layer 424, a material layer for forming the shield layer 427-1 and a material layer for forming the upper electrode layer 425 and etching these material layers using a mask pattern (not shown). Then, the sidewall spacer layer 460-1 may be conformally formed. Then, the lower electrode layer 421 and the selector layer 422 may be formed by etching the material layer for forming the selector layer 422 and the material layer for forming the lower electrode layer 421. At this time, the sidewall spacer layer 460-1 may remain on sidewalls of the middle electrode layer 423, the memory layer 424, the shield layer 427-1 and the upper electrode layer 425. Then, the second conductive lines 430 may be formed by forming a conductive layer for forming the second conductive lines 430 and etching the conductive layer using a mask pattern in a line shape extending in a second direction.

According to the implementation, in addition to the advantages that can be obtained by the implementations shown in FIGS. 1B and 2B, the sidewall spacer layer 460-1 can protect the middle electrode layer 423, the memory layer 424, the shield layer 427-1 and the upper electrode layer 425 more effectively during a patterning process for forming the selector layer 422 and the lower electrode layer 421.

Referring to FIG. 4B, the semiconductor device may include a substrate 400, first conductive lines 410, a memory cell 420-2, second conductive lines 430 and a sidewall spacer layer 460-2. The memory cell 420-2 may include a lower electrode layer 421, a selector layer 422, a shield layer 427-2, a memory layer 424 and an upper electrode layer 425 which are sequentially stacked.

The shield layer 427-2 may be formed between the selector layer 422 and the memory layer 424. The shield layer 427-2 may include the MXene material and be formed as a uniform layer having low roughness and a small thickness. Thus, it is possible to prevent the shield layer 427-2 from affecting the structure of the semiconductor device and interfering operations of the semiconductor device.

The sidewall spacer layer 460-2 may be formed on sidewalls of the shield layer 427-2, the memory layer 424 and the upper electrode layer 425. The sidewall spacer layer 460-2 may include an insulating material. The insulating material may include an oxide, a nitride, or a combination thereof.

The semiconductor device in accordance with the implementation may be formed by a method similar to the method explained with reference to FIG. 4A. According to the implementation, in addition to advantages that can be obtained by the implementation shown in FIG. 3A, sidewall spacer layer 460-2 can protect the remaining layer included in the memory cell 420-2 more effectively during a patterning process for forming the selector layer 422 and the lower electrode layer 421.

Referring to FIG. 4C, the semiconductor device may include a substrate 400, first conductive lines 410, a memory cell 420-3, second conductive lines 430, an encapsulation layer 440, a shield layer 450 and a sidewall spacer layer 460-3. The memory cell 420-3 may include a lower electrode layer 421, a selector layer 422, a middle electrode layer 423, a memory layer 424 and an upper electrode layer 425 which are sequentially stacked.

The encapsulation layer 440 may serve to protect the memory cell 420-3 by encapsulating the memory cell 420-3. The encapsulation layer 440 may by formed to surround side surfaces of the memory cell 420-3 and a surface of the first conductive lines 410. The encapsulation layer 440 may include an insulating material. The insulating material may include an oxide, a nitride, or a combination thereof. For example, the encapsulation layer 440 may include $SiO_2$, $SiN_4$, SiOCN, SiON, or a combination thereof.

The encapsulation layer 440 may be formed to have a thickness equal to or greater than a predetermined thickness in order to control damage of the memory layer 424 during forming the second conductive lines 430.

The shield layer 450 may be conformally formed over the encapsulation layer 440. The shield layer 450 may include the MXene material and be formed as a uniform layer having low roughness and a small thickness.

The sidewall spacer layer 460-3 may be formed on sidewalls of the middle electrode layer 423, the memory layer 424 and the upper electrode layer 425. The sidewall spacer layer 460-2 may include an insulating material. The insulating material may include an oxide, a nitride, or a combination thereof.

The semiconductor device in accordance with the implementation may be formed by a method similar to the method explained with reference to FIGS. 3B and 4A. According to the implementation, in addition to advantages that can be obtained by the implementation shown in FIG. 3B, the sidewall spacer layer 460-3 can protect the remaining layer included in the memory cell 420-3 more effectively during a patterning process for forming the selector layer 422 and the lower electrode layer 421.

FIGS. 5A to 5H are cross-sectional views illustrating modifications by combination of one or more implementations of FIGS. 1A, 1B, 2A, 2B, 3A, 3B, and 4A to 4C. The detailed descriptions similar to those described in the implementations shown in FIGS. 1A, 1B, 2A, 2B, 3A, 3B, and 4A to 4C will be omitted.

Figure 5A:
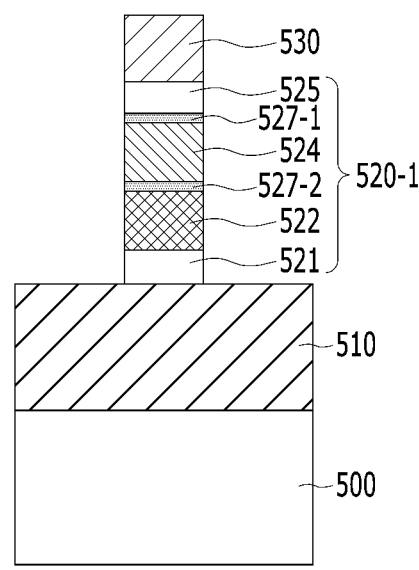
FIGS. 5A to 5H illustrate another example of a semiconductor device based on some implementations of the disclosed technology.

Referring to FIG. 5A, the semiconductor device may include a substrate 500, first conductive lines 510, a memory cell 520-1 and second conductive lines 530. The memory cell 520-1 may include a lower electrode layer 521, a selector layer 522, a shield layer 527-2, a memory layer 524, a shield layer 527-1 and an upper electrode layer 525. Each of the shield layers 527-1 and 527-2 may include the MXene material and be formed as a uniform layer having low roughness and a small thickness. Thus, the semiconductor device shown in FIG. 5A may include the shield layer 527-1 disposed over the memory layer 524 and shield layer 527-2 disposed under the memory layer 524.

Figure 5B:
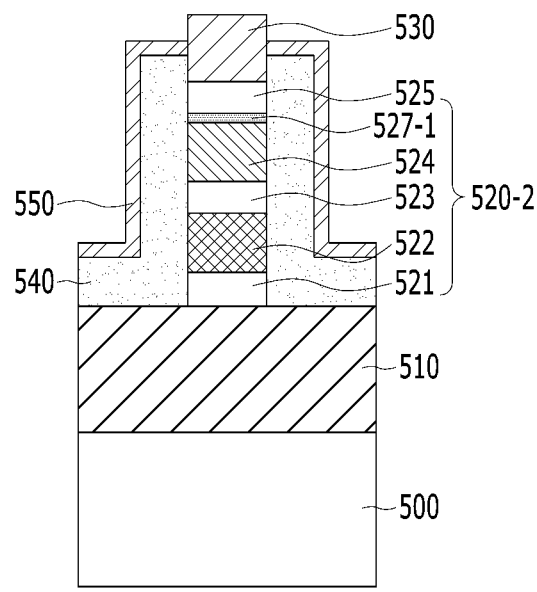

Referring to FIG. 5B, the semiconductor device may include a substrate 500, first conductive lines 510, a memory cell 520-2, second conductive lines 530, an encapsulation layer 540 and a shield layer 550. The memory cell 520-2 may include a lower electrode layer 521, a selector layer 522, a middle electrode layer 523, a memory layer 524, a shield layer 527-1 and an upper electrode layer 525 which are sequentially stacked. Each of the shield layers 527-1 and 550 may include the MXene material and be formed as a uniform layer having low roughness and a small thickness. That is, the semiconductor device shown in FIG. 5B may include the shield layer 527-1 disposed over the memory layer 524 and the shield layer 5520 disposed over the encapsulation layer 540.

Figure 5C:
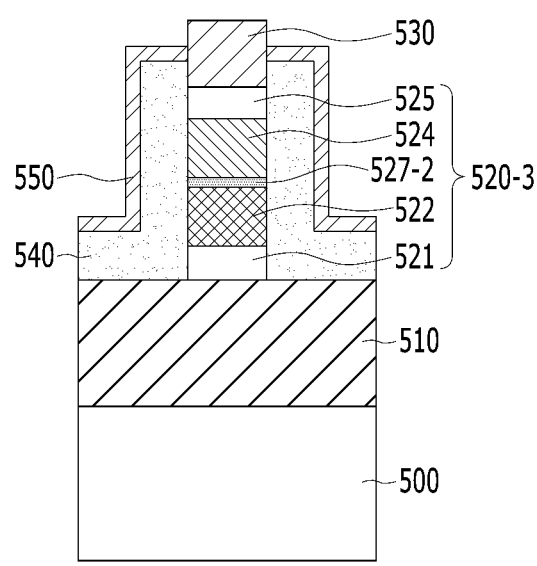

Referring to FIG. 5C, the semiconductor device may include a substrate 500, first conductive lines 510, a memory cell 520-3, second conductive lines 530, an encapsulation layer 540 and a shield layer 550. The memory cell 520-3 may include a lower electrode layer 521, a selector layer 522, a shield layer 527-2, a memory layer 524 and an upper electrode layer 525 which are sequentially stacked. Each of the shield layers 527-2 and 550 may include the MXene material and be formed as a uniform layer having low roughness and a small thickness. That is, the semiconductor device shown in FIG. 5C may include the shield layer 527-2 disposed under the memory layer 524 and the shield layer 550 disposed over the encapsulation layer 540.

Figure 5D:
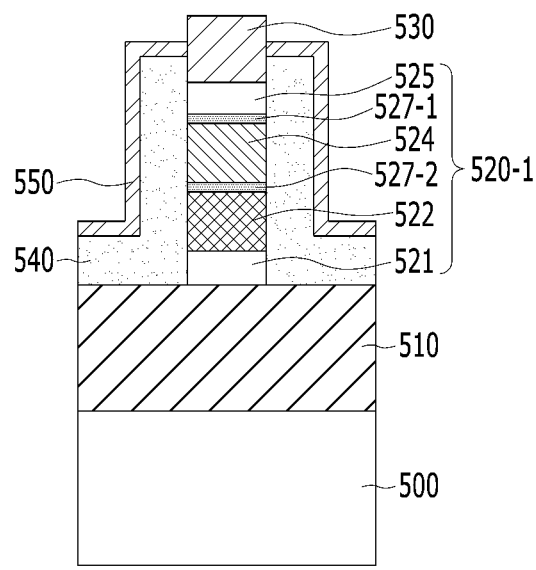

Referring to FIG. 5D, the semiconductor device may include a substrate 500, first conductive lines 510, a memory cell 520-1, second conductive lines 530, an encapsulation layer 540 and a shield layer 550. The memory cell 520-1 may include a lower electrode layer 521, a selector layer 522, a shield layer 527-2, a memory layer 524, a shield layer 527-1 and an upper electrode layer 525 which are sequentially stacked. Each of the shield layers 527-1, 527-2 and 550 may include the MXene material and be formed as a uniform layer having low roughness and a small thickness. Thus, the semiconductor device shown in FIG. 5D may include the shield layer 527-1 disposed over the memory layer 524, the shield layer 527-2 disposed under the memory layer 524 and the shield layer disposed over the encapsulation layer 540.

Figure 5E:
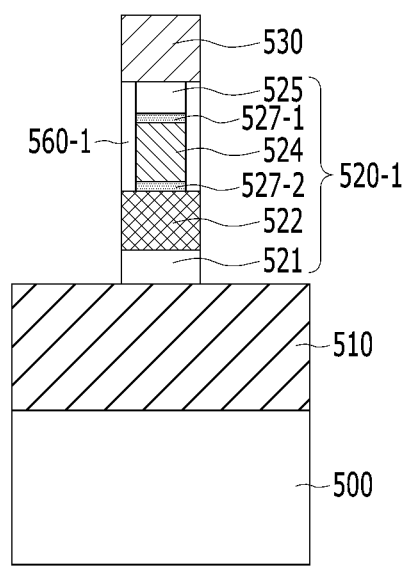

Referring to FIG. 5E, the semiconductor device may include a substrate 500, first conductive lines 510, a memory cell 520-1, a second conductive lines 530 and a sidewall spacer layer 560-1. The memory cell 520-1 may include a lower electrode layer 521, a selector layer 522, a shield layer 527-2, a memory layer 524, a shield layer 527-1 and an upper electrode layer 525 which are sequentially stacked. Each of the shield layers 527-1 and 527-2 may include the MXene material and be formed as a uniform layer having low roughness and a small thickness. The sidewall spacer layer 560-1 may be formed on sidewalls of the shield layer 527-2, the memory layer 524, the shield layer 527-1 and the upper electrode layer 525. That is, the semiconductor device shown in FIG. 5E may include the shield layer 527-1 disposed over the memory layer 524, the shield layer 527-2 disposed under the memory layer 524 and the sidewall spacer layer 560-1.

Figure 5F:
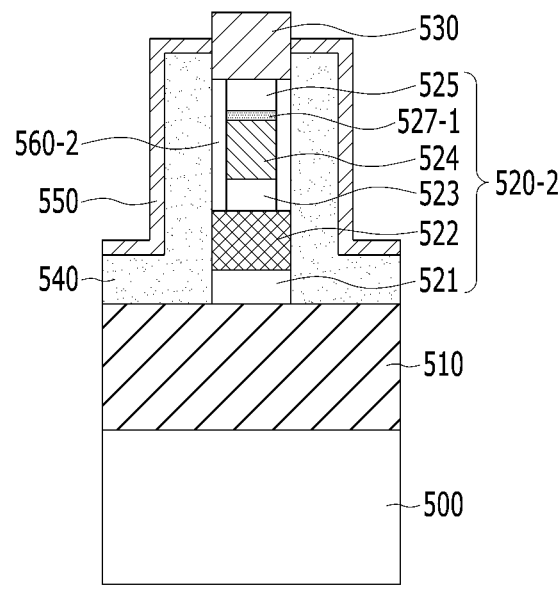

Referring to FIG. 5F, the semiconductor device may include a substrate 500, first conductive lines 510, a memory cell 520-2, second conductive lines 530, an encapsulation layer 540, a shield layer 550 and a sidewall spacer layer 560-2. The memory cell 520-2 may include a lower electrode layer 521, a selector layer 522, a middle electrode layer 523, a memory layer 524, a shield layer 527-1 and an upper electrode layer 525 which are sequentially stacked. Each of the shield layers 527-1 and 550 may include the MXene material and be formed as a uniform layer having low roughness and a small thickness. The sidewall spacer layer 560-2 may be formed on sidewalls of the middle electrode layer 523, the memory layer 524, the shield layer 527-1 and the upper electrode layer 525. That is, the semiconductor device shown in FIG. 5F may include the shield layer 527-1 over the memory layer 524, the shield layer 550 disposed over the encapsulation layer 540 and the sidewall spacer layer 560-2.

Figure 5G:
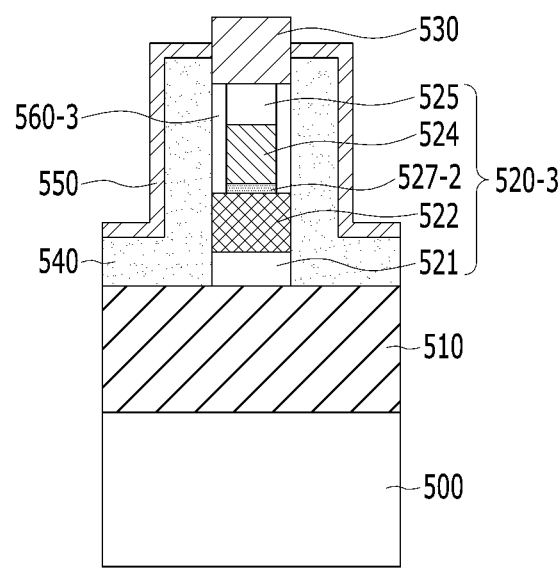

Referring to FIG. 5G, the semiconductor device may include a substrate 500, first conductive lines 510, a memory cell 520-3, second conductive lines 530, an encapsulation layer 540, a shield layer 550 and a sidewall spacer layer 560-3. The memory cell 520-3 may include a lower electrode layer 521, a selector layer 522, a shield layer 527-2, a memory layer 524 and an upper electrode layer 525 which are sequentially stacked. Each of the shield layers 527-2 and 550 may include the MXene material and be formed as a uniform layer having low roughness and a small thickness. The sidewall spacer layer 560-3 may be formed on sidewalls of the shield layer 527-2, the memory layer 524 and the upper electrode layer 525. That is, the semiconductor device shown in FIG. 5G may include the shield layer 527-2 under the memory layer 524, the shield layer 550 over the encapsulation layer 540 and the sidewall spacer layer 560-3.

Figure 5H:
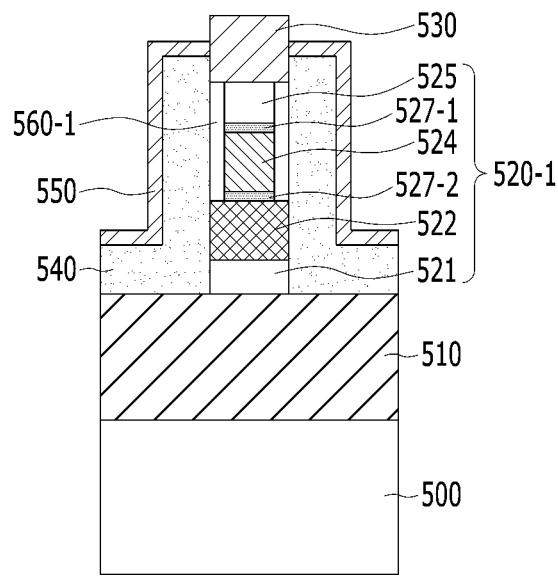

Referring to FIG. 5H, the semiconductor device may include a substrate 500, first conductive lines 510, a memory cell 520-1, second conductive lines 530, an encapsulation layer 540, a shield layer 550 and a sidewall spacer layer 560-1. The memory cell 520-1 may include a lower electrode layer 521, a selector layer 522, a shield layer 527-2, a memory layer 524, a shield layer 527-1 and an upper electrode layer 525 which are sequentially stacked. Each of the shield layers 527-1, 527-2 and 550 may include the MXene material and be formed as a uniform layer having low roughness and a small thickness. The sidewall spacer layer 560-1 may be formed on sidewalls of the shield layer 527-2, the memory layer 524, the shield layer 527-1 and the upper electrode layer 525. That is, the semiconductor device shown in FIG. 5H may include the shield layer 527-1 disposed over the memory layer 524, the shield layer 527-2 under the memory layer 524, the shield layer 550 over the encapsulation layer 540 and the sidewall spacer layer 560-1.

In the implementations described above, each of the semiconductor devices includes the selector layer 122, 222, 322, 422 or 522 and the memory layer 124, 224, 324, 424 or 524 are formed on an upper portion and a lower portion of the same element in order to form a high-density cross-point array. In another implementation, a semiconductor device may include only the variable resistance layer such as a magnetic tunnel junction (MTJ) in the element. It will be described with reference to FIGS. 6, 7A and 7B, 8A to 8C and 9A to 9H.

FIGS. 6, 7A and 7B, 8A to 8C and 9A to 9H illustrate another example of a semiconductor device based on some implementations of the disclosed technology. The detailed descriptions similar to those described in the implementations shown in the implementations shown in FIGS. 1B, 2B, 3A and 3B, 4A to 4C and 5A to 5H will be omitted.

Figure 6:
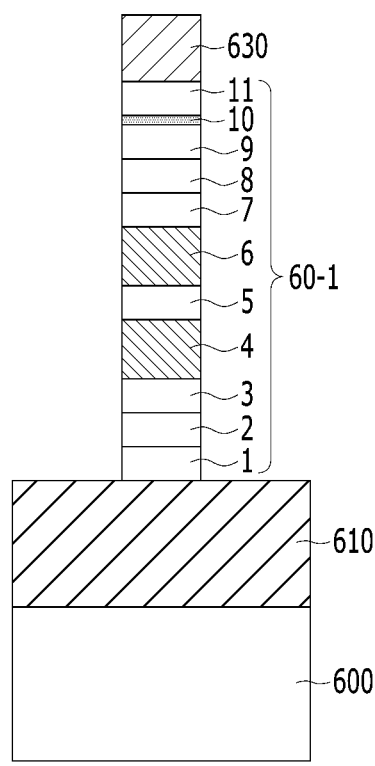
FIG. 6 illustrates another example of a semiconductor device based on some implementations of the disclosed technology.

Referring to FIG. 6, the semiconductor device may include first conductive lines 610 formed over a substrate 600 and extending in a first direction, second conductive lines 630 formed over the first conductive lines 610 to be spaced apart from the first conductive lines 610 and extending in a second direction crossing the first direction, and a variable resistance element 60-1 disposed at intersections of the first conductive lines 610 and the second conductive lines 630 between the first conductive lines 610 and the second conductive lines 630. The variable resistance element 60-1 may include an MTJ structure including a free layer 4 having a variable magnetization direction, a pinned layer 6 having a pinned magnetization direction and a tunnel barrier layer 5 interposed between the free layer 4 and the pinned layer 6.

The free layer 4 may have one of different magnetization directions or one of different spin directions of electrons to switch the polarity of the free layer 4 in the MTJ structure, resulting in changes in resistance value. In some implementations, the polarity of the free layer 4 is changed or flipped upon application of a voltage or current signal (e.g., a driving current above a certain threshold) to the MTJ structure. With the polarity changes of the free layer 4, the free layer 4 and the pinned layer 6 have different magnetization directions or different spin directions of electron, which allows the variable resistance element 60-1 to store different data or represent different data bits. The free layer 4 may also be referred as a storage layer. The magnetization direction of the free layer 4 may be substantially perpendicular to a surface of the free layer 4, the tunnel barrier layer 5 and the pinned layer 6. Thus, the magnetization direction of the free layer 4 may be substantially parallel to stacking directions of the free layer 4, the tunnel barrier layer 5 and the pinned layer 6. Therefore, the magnetization direction of the free layer 4 may be changed between a downward direction and an upward direction. The change in the magnetization direction of the free layer 4 may be induced by a spin transfer torque generated by an applied current or voltage.

The free layer 4 may have a single-layered structure or a multi-layered structure including a ferromagnetic material. For example, the free layer 4 may include an alloy based on Fe, Ni or Co, for example, an Fe—Pt alloy, an Fe—Pd alloy, a Co—Pd alloy, a Co—Pt alloy, a Co—Fe alloy, an Fe—Ni—Pt alloy, a Co—Fe—Pt alloy, a Co—Ni—Pt alloy, or a Co—Fe—B alloy, or others, or may include a stack of metals, such as Co/Pt, or Co/Pd, or others.

The tunnel barrier layer 5 may allow the tunneling of electrons in both data reading and data writing operations. In a write operation for storing new data, a high write current may be directed through the tunnel barrier layer 5 to change the magnetization direction of the free layer 4 and thus to change the resistance state of the MTJ for writing a new data bit. In a reading operation, a low reading current may be directed through the tunnel barrier layer 5 without changing the magnetization direction of the free layer 4 to measure the existing resistance state of the MTJ under the existing magnetization direction of the free layer 4 to read the stored data bit in the MTJ. The tunnel barrier layer 5 may include a dielectric oxide such as MgO, CaO, SrO, TiO, VO, or NbO or others.

The pinned layer 6 may have a pinned magnetization direction, which remains unchanged while the magnetization direction of the free layer 4 changes. The pinned layer 6 may be referred to as a reference layer. In some implementations, the magnetization direction of the pinned layer 6 may be pinned in a downward direction. In some implementations, the magnetization direction of the pinned layer 6 may be pinned in an upward direction.

The pinned layer 6 may have a single-layered structure or a multi-layered structure including a ferromagnetic material. For example, the pinned layer 6 may include an alloy based on Fe, Ni or Co, for example, an Fe—Pt alloy, an Fe—Pd alloy, a Co—Pd alloy, a Co—Pt alloy, a Co—Fe alloy, an Fe—Ni—Pt alloy, a Co—Fe—Pt alloy, a Co—Ni—Pt alloy, or a Co—Fe—B alloy, or may include a stack of metals, such as Co/Pt, or Co/Pd or others.

If a voltage or current is applied to the variable resistance element 60-1, the magnetization direction of the free layer 4 may be changed by spin torque transfer. In some implementations, when the magnetization directions of the free layer 4 and the pinned layer 6 are parallel to each other, the variable resistance element 60-1 may be in a low resistance state, and this may indicate digital data bit "0." Conversely, when the magnetization directions of the free layer 4 and the pinned layer 6 are anti-parallel to each other, the variable resistance element 60-1 may be in a high resistance state, and this may indicate a digital data bit "1." In some implementations, the variable resistance element 60-1 can be configured to store data bit '1' when the magnetization directions of the free layer 4 and the pinned layer 6 are parallel to each other and to store data bit '0' when the magnetization directions of the free layer 4 and the pinned layer 6 are anti-parallel to each other.

In some implementations, the variable resistance element 60-1 may further include one or more layers performing various functions to improve a characteristic of the MTJ structure. For example, the variable resistance element 60-1 may further include at least one of a lower electrode layer 1, a buffer layer 2, an under layer 3, a spacer layer 7, a magnetic correction layer 8, a capping layer 9, a shield layer 10 and an upper electrode layer 11.

Each of the lower electrode layer 1 and the upper electrode layer 11 may include a single-layered structure or a multi-layered structure including various conductive materials such as a metal, a metal nitride, a conductive carbon material, or a combination thereof, respectively. For example, lower electrode layer 1 and the upper electrode layer 11 may include tungsten (W), titanium (Ti), tantalum (Ta), platinum (Pt), aluminum (Al), copper (Cu), copper (Cu), zinc (Zn), nickel (Ni), cobalt (Co), lead (Pb), tungsten nitride (WN), tungsten silicide (WSi), titanium nitride (TiN), titanium silicon nitride (TiSiN), titanium aluminum nitride (TiAlN), tantalum nitride (TaN), tantalum silicon nitride (TaSiN), tantalum aluminum nitride (TaAlN), carbon (C), silicon carbide (SiC), or silicon carbon nitride (SiCN), or a combination thereof.

The buffer layer 2 may be disposed below the under layer 3 to facilitate crystal growth of the under layer 3, thus improving perpendicular magnetic crystalline anisotropy of the free layer 4. The buffer layer 2 may have a single-layered structure or a multi-layered structure including a metal, a metal alloy, a metal nitride, or a metal oxide, or a combination thereof. In some implementations, the buffer layer 2 may be formed of or include a material having a good compatibility with a bottom electrode (not shown) in order to resolve the lattice constant mismatch between the bottom electrode and the under layer 3. For example, the buffer layer 2 may include tantalum (Ta).

The under layer 3 may be disposed under the free layer 4 and serve to improve perpendicular magnetic crystalline anisotropy of the free layer 4. The under layer 3 may have a single-layered structure or a multi-layered structure including a metal, a metal alloy, a metal nitride, or a metal oxide, or a combination thereof. For example, the under layer 3 may include one or more of TaN, AlN, SiN, TiN, VN, CrN, GaN, GeN, ZrN, NbN, MoN or HfN.

The spacer layer 7 may be interposed between the pinned layer 6 and the magnetic correction layer 8 and function as a buffer between the magnetic correction layer 8 and the pinned layer 6. The spacer layer 7 may serve to improve characteristics of the magnetic correction layer 8. The spacer layer 7 may include a noble metal such as ruthenium (Ru).

The magnetic correction layer 8 may serve to offset the effect of the stray magnetic field produced by the pinned layer 6. In this case, the effect of the stray magnetic field of the pinned layer 6 can decrease, and thus a biased magnetic field in the free layer 4 can decrease. The magnetic correction layer 8 may have a magnetization direction anti-parallel to the magnetization direction of the pinned layer 6. In the implementation, when the pinned layer 6 has a downward magnetization direction, the magnetic correction layer 8 may have an upward magnetization direction. Conversely, when the pinned layer 6 has an upward magnetization direction, the magnetic correction layer 8 may have a downward magnetization direction. The magnetic correction layer 8 may be coupled with the pinned layer 6 via the spacer layer 7 to form a synthetic anti-ferromagnet (SAF) structure. The magnetic correction layer 8 may have a single-layered structure or a multi-layered structure including a ferromagnetic material.

In this implementation, the magnetic correction layer 8 is located above the pinned layer 6, but the magnetic correction layer 8 may disposed at a different location. For example, the magnetic correction layer 8 may be located above, below, or next to the MTJ structure while the magnetic correction layer 8 is patterned separately from the MTJ structure.

The capping layer 9 may be used to protect the variable resistance element 60-1 and/or function as a hard mask for patterning the variable resistance element 60-1. In some implementations, the capping layer 9 may include various conductive materials such as a metal. In some implementations, the capping layer 9 may include a metallic material having almost none or a small number of pin holes and high resistance to wet and/or dry etching. In some implementations, the capping layer 9 may include a metal, a nitride, or an oxide, or a combination thereof. For example, the capping layer 9 may include a noble metal such as ruthenium (Ru).

The capping layer 9 may have a single-layered structure or a multi-layered structure. In some implementations, the capping layer 9 may have a multilayer structure including an oxide, or a metal, or a combination thereof. For example, the capping layer 9 may have a multilayer structure of an oxide layer, a first metal layer and a second metal layer.

A material layer (not shown) for resolving the lattice structure differences and the lattice constant mismatch between the pinned layer 6 and the magnetic correction layer 8 may be interposed between the pinned layer 6 and the magnetic correction layer 8. For example, this material layer may be amorphous and may include a metal a metal nitride, or metal oxide.

The shield layer 10 may be formed between the capping layer 9 and the upper electrode layer 11. The shield layer 10 may include an MXene material and be formed as a uniform layer having low roughness and a small thickness.

According to the implementations, since the thin and uniform shield layer 10 including the MXene material is formed in the variable resistance element 60-1, EMI from external sources and a stray magnetic field from an adjacent variable resistance element 60-1 can be shielded with high efficiency. Therefore, it is possible to improve the performance of the semiconductor device. Further, the shield layer 10 is formed as a thin and uniform layer that does not interfere with the structure of the semiconductor device and has electrical conductivity that does not interfere with the operation of the variable resistance element 60-1, it is possible to further improve the performance of the semiconductor device. In addition, the shield layer 10 is lighter than the metal materials and may be formed at low cost.

Figure 7A:
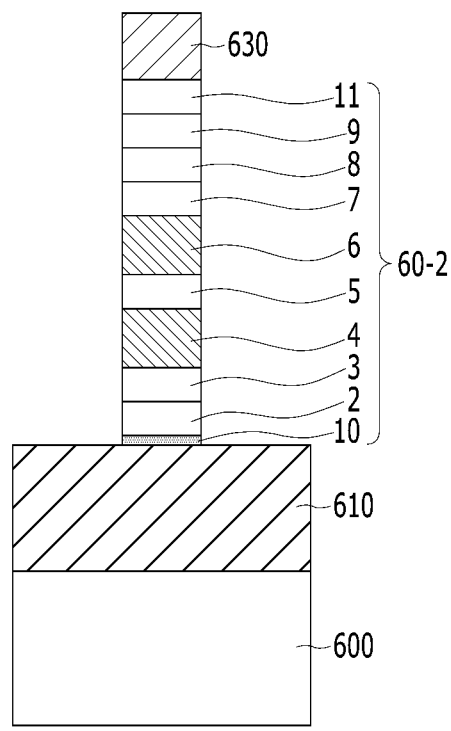
FIGS. 7A and 7B illustrate another example of a semiconductor device based on some implementations of the disclosed technology.
Figure 7B:
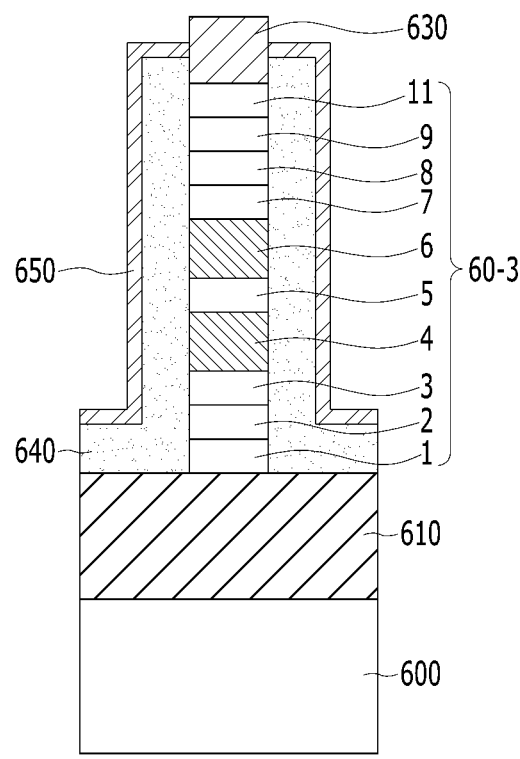

FIGS. 7A and 7B illustrate another example of a semiconductor device based on some implementations of the disclosed technology.

The implementation shown in FIG. 7A may be similar to the implementation shown in FIG. 6 except that a shield layer 10 including an MXene material is formed between first conductive lines 610 and a buffer layer 2 and a lower electrode layer is omitted. The detailed descriptions similar to those described in the implementation shown in FIG. 6 will be omitted.

Referring to FIG. 7A, the semiconductor device may include a substrate 600, first conductive lines 610, a variable resistance element 60-2 and second conductive lines 630. The variable resistance element 60-2 may include a shield layer 10, a buffer layer 2, an under layer 3, a free layer 4, a tunnel barrier layer 5, a pinned layer 6, a spacer layer 7, a magnetic correction layer 8, a capping layer 9 and an upper electrode layer 11 which are sequentially stacked. The shield layer 10 may include the MXene material and be formed as a uniform layer having low roughness and a small thickness.

In the implementation, a lower electrode layer is omitted. In another implementation, the lower electrode layer may be further formed.

The implementation shown in FIG. 7B may be similar to the implementation shown in FIG. 6 except that a shield layer 650 including an MXene material is formed over an encapsulation layer 640 for encapsulating the semiconductor device. The detailed descriptions similar to those described in the implementations shown in FIG. 6 will be omitted.

Referring to FIG. 7B, the semiconductor device may include a substrate 600, first conductive lines 610, a variable resistance element 60-3, second conductive lines 630, an encapsulation layer 640 and a shield layer 650. The variable resistance element 60-3 may include a lower electrode layer 1, a buffer layer 2, an under layer 3, a free layer 4, a tunnel barrier layer 5, a pinned layer 6, a spacer layer 7, a magnetic correction layer 8, a capping layer 9 and an upper electrode layer 11. The encapsulation layer 640 may serve to protect the variable resistance element 60-3 by encapsulating the variable resistance element 60-3. The encapsulation layer 640 may be formed to surround sidewalls of the variable resistance element 60-3 and a surface of the first conductive lines 610. The encapsulation layer 640 may include an insulating material. The shield layer 650 may include the MXene material and be formed as a uniform layer having low roughness and a small thickness.

According to the implementations, since the shield layer 650 including the MXene material is formed over the encapsulation layer 640 for encapsulating the variable resistance element 60-3, the semiconductor device may have a double-layer structure including an internal insulating layer and an external electrically conductive MXene material layer. Therefore, the variable resistance element 60-3 can be protected more effectively through the double-layer structure. Further, EMI from external sources and a stray field from an adjacent variable resistance element 60-3 can be shielded with high efficiency. Moreover, the shield layer 650 having a thin thickness does not affect the structure of the semiconductor device, thereby improving the operational reliability of the device.

Figure 8A:
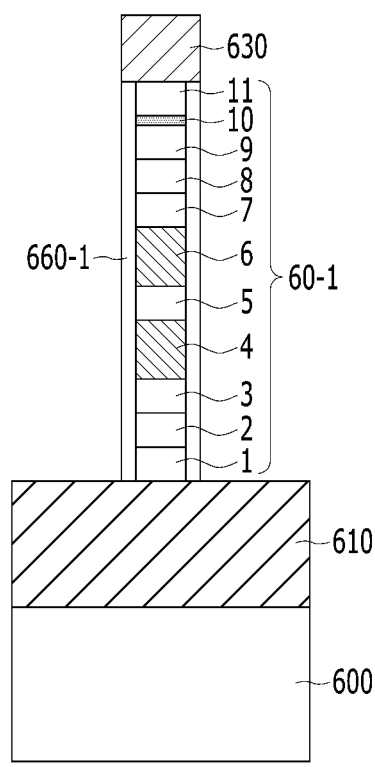
FIGS. 8A to 8C illustrate another example of a semiconductor device based on some implementations of the disclosed technology.
Figure 8B:
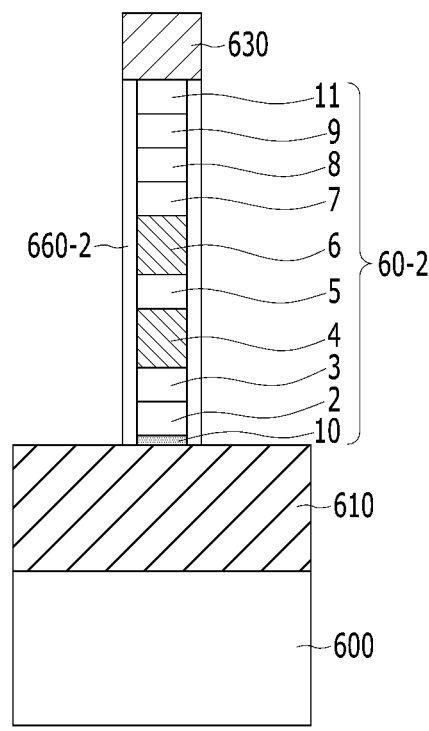
Figure 8C:
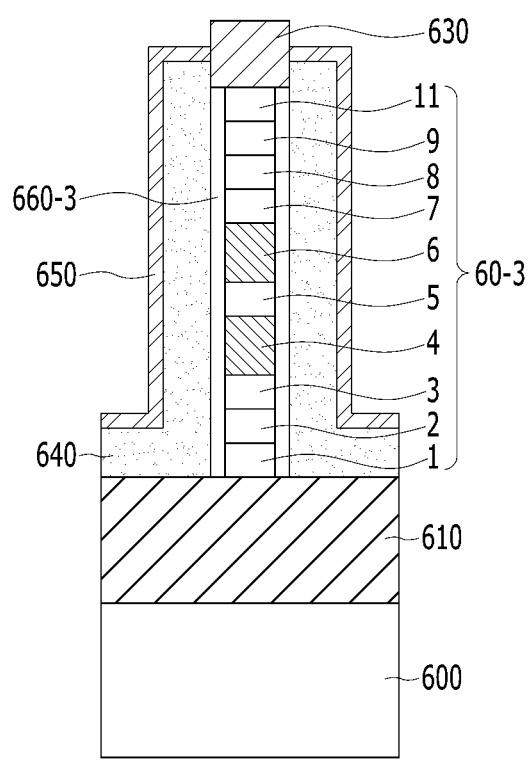

FIGS. 8A to 8C illustrate another example of a semiconductor device based on some implementations of the disclosed technology.

The implementations shown in FIGS. 8A to 8C may be similar to the implementations shown in FIGS. 6, 7A and 7B except that a sidewall spacer layer 660-1, 660-2 or 660-3 is further formed on sidewalls of a variable resistance element 60-1, 60-2 or 60-3. The detailed descriptions similar to those described in the implementations shown in FIGS. 6, 7A and 7B will be omitted.

Referring to FIG. 8A, the semiconductor device may include a substrate 600, first conductive lines 610, a variable resistance element 60-1, second conductive lines 630 and a sidewall spacer layer 660-1. The variable resistance element 60-1 may include a lower electrode layer 1, a buffer layer 2, an under layer 3, a free layer 4, a tunnel barrier layer 5, a pinned layer 6, a spacer layer 7, a magnetic correction layer 8, a capping layer 9, a shield layer 10 and an upper electrode layer 11. The shield layer 10 may be formed between the capping layer 9 and the upper electrode layer 11. The shield layer 10 may include an MXene material and be formed as a uniform layer having low roughness and a small thickness. The sidewall spacer layer 660-1 may be formed on sidewalls of the variable resistance element 60-1.

Referring to FIG. 8B, the semiconductor device may include a substrate 600, first conductive lines 610, a variable resistance element 60-2, second conductive lines 630 and a sidewall spacer layer 660-2. The variable resistance element 60-2 may include a shield layer 10, a buffer layer 2, an under layer 3, a free layer 4, a tunnel barrier layer 5, a pinned layer 6, a spacer layer 7, a magnetic correction layer 8, a capping layer 9 and an upper electrode layer 11 which are sequentially stacked. The shield layer 10 may be formed under the buffer layer 2. The shield layer 10 may include the MXene material and be formed as a uniform layer having low roughness and a small thickness. The sidewall spacer layer 660-2 may be formed on sidewalls of the variable resistance element 60-2.

Referring to FIG. 8C, the semiconductor device may include a substrate 600, first conductive lines 610, a variable resistance element 60-3, second conductive lines 630, an encapsulation layer 640, a shield layer 650 and a sidewall spacer layer 660-3. The variable resistance element 60-3 may include a lower electrode layer 1, a buffer layer 2, an under layer 3, a free layer 4, a tunnel barrier layer 5, a pinned layer 6, a spacer layer 7, a magnetic correction layer 8, a capping layer 9 and an upper electrode layer 11. The encapsulation layer 640 may be formed to surround sidewalls of the variable resistance element 60-3 and a surface of the first conductive lines 610. The shield layer 650 may be formed over the encapsulation layer 640. The shield layer 650 may include the MXene material and be formed as a uniform layer having low roughness and a small thickness. The sidewall spacer layer 660-3 may be formed on sidewalls of the variable resistance element 60-3.

According to the implementation, in addition to the advantages that can be obtained by the implementation shown in FIGS. 6, 7A and 7B, the variable resistance element 60-1, 60-2 or 60-3 can be protected more effectively from subsequent processes or external factors by the sidewall spacer layer 660-1, 660-2 or 660-3.

FIGS. 9A to 9H are cross-sectional views illustrating modifications by combination of one or more implementations of FIGS. 6, 7A, 7B and 8A to 8C. The detailed descriptions similar to those described in the implementations FIGS. 6, 7A, 7B and 8A to 8C will be omitted.

Figure 9A:
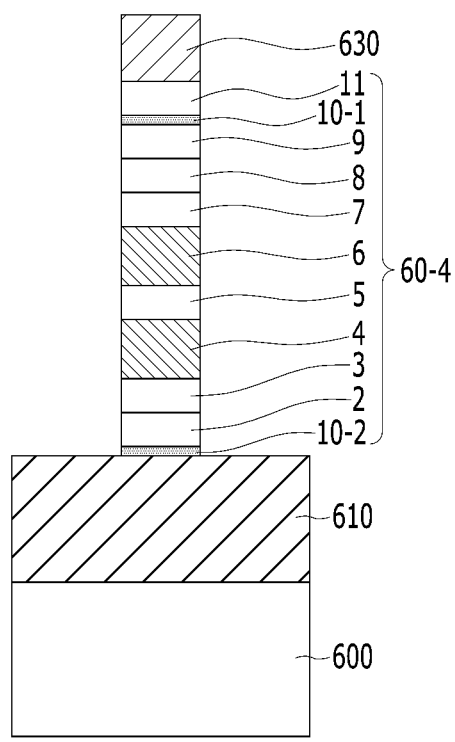
FIGS. 9A to 9H illustrate another example of a semiconductor device based on some implementations of the disclosed technology.

Referring to FIG. 9A, the semiconductor device may include a substrate 600, first conductive lines 610, a variable resistance element 60-4 and second conductive lines 630. The variable resistance element 60-4 may include a shield layer 10-2, a buffer layer 2, an under layer 3, a free layer 4, a tunnel barrier layer 5, a pinned layer 6, a spacer layer 7, a magnetic correction layer 8, a capping layer 9, a shield layer 10-1 and an upper electrode layer 11 which are sequentially stacked. Each of the shield layers 10-1 and 10-2 may include the MXene material and be formed as a uniform layer having low roughness and a small thickness. That is, the semiconductor device shown in FIG. 9A may include two shield layers 10-1 and 10-2 disposed in the variable resistance element 60-4.

Figure 9B:
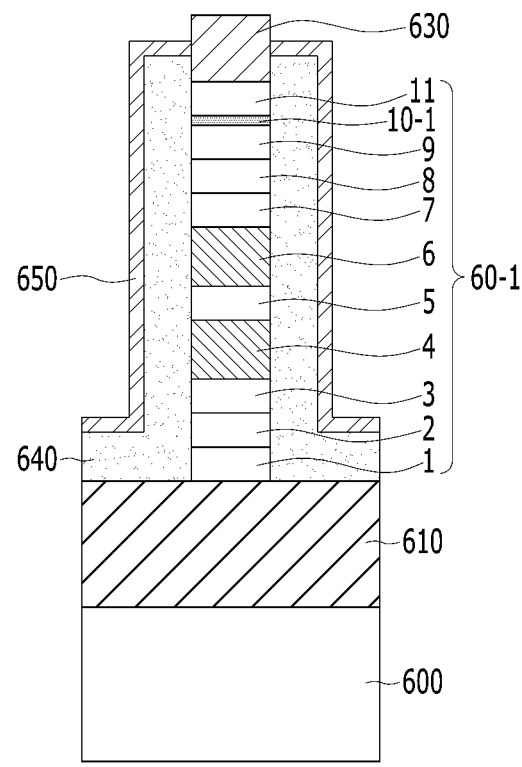

Referring to FIG. 9B, the semiconductor device may include a substrate 600, first conductive lines 610, a variable resistance element 60-1, second conductive lines 630, an encapsulation layer 640 and a shield layer 650. The variable resistance element 60-1 may include a lower electrode layer 1, a buffer layer 2, an under layer 3, a free layer 4, a tunnel barrier layer 5, a pinned layer 6, a spacer layer 7, a magnetic correction layer 8, a capping layer 9, a shield layer 10-1 and an upper electrode layer 11 which are sequentially stacked. Each of the shield layers 10-1 and 650 may include the MXene material and be formed as a uniform layer having low roughness and a small thickness. That is, the semiconductor device shown in FIG. 9B may include the shield layer 10-1 disposed in the variable resistance element 60-1 and the shield layer 650 disposed over the encapsulation layer 640.

Figure 9C:
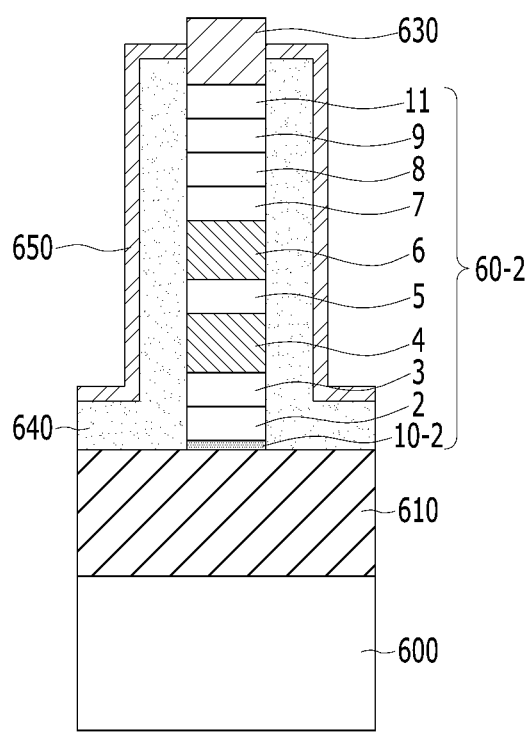

Referring to FIG. 9C, the semiconductor device may include a substrate 600, first conductive lines 610, a variable resistance element 60-2, second conductive lines 630, an encapsulation layer 640 and a shield layer 650. The variable resistance element 60-2 may include a shield layer 10-2, a buffer layer 2, a under layer 3, a free layer 4, a tunnel barrier layer 5, a pinned layer 6, a spacer layer 7, a magnetic correction layer 8, a capping layer 9 and an upper electrode layer 11 which are sequentially stacked. Each of the shield layers 10-2 and 650 may include the MXene material and be formed as a uniform layer having low roughness and a small thickness. That is, the semiconductor device shown in FIG. 9C may include the shield layer 10-2 disposed in the variable resistance element 60-2 and the shield layer 650 disposed over the encapsulation layer 640.

Figure 9D:
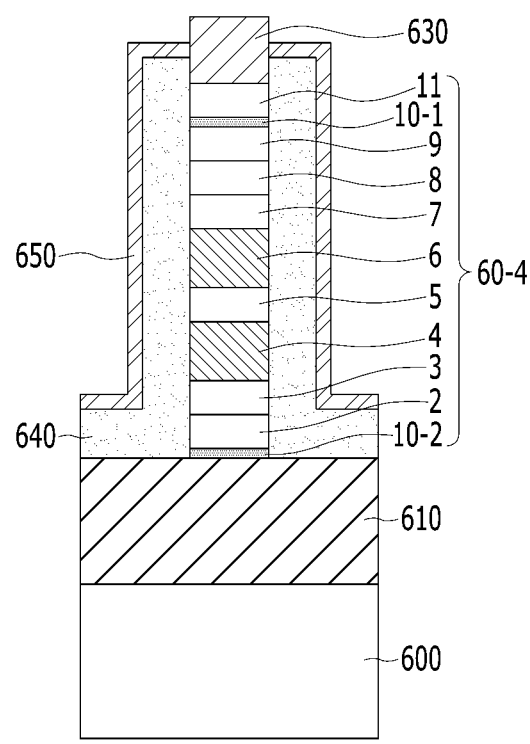

Referring to FIG. 9D, the semiconductor device may include a substrate 600, first conductive lines 610, a variable resistance element 60-4, second conductive lines 630, an encapsulation layer 640 and a shield layer 650. The variable resistance element 60-4 may include a shield layer 10-2, a buffer layer 2, an under layer 3, a free layer 4, a tunnel barrier layer 5, a pinned layer 6, a spacer layer 7, a magnetic correction layer 8, a capping layer 9, a shield layer 10-1 and an upper electrode layer 11 which are sequentially stacked. Each of the shield layers 10-1, 10-2 and 650 may include the MXene material and be formed as a uniform layer having low roughness and a small thickness. That is, the semiconductor device shown in FIG. 9D may include the shield layers 10-1 and 10-2 disposed in the variable resistance element 60-4 and the shield layer 650 disposed over the encapsulation layer 640.

Figure 9E:
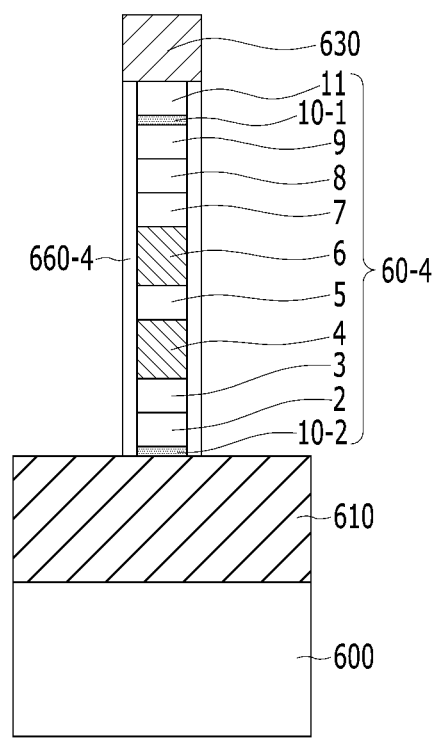

Referring to FIG. 9E, the semiconductor device may include a substrate 600, first conductive lines 610, a variable resistance element 60-4, second conductive lines 630 and a sidewall spacer layer 660-4. The variable resistance element 60-4 may include a shield layer 10-2, a buffer layer 2, an under layer 3, a free layer 4, a tunnel barrier layer 5, a pinned layer 6, a spacer layer 7, a magnetic correction layer 8, a capping layer 9, a shield layer 10-1 and an upper electrode layer 11 which are sequentially stacked. Each of the shield layers 10-1 and 10-2 may include the MXene material and be formed as a uniform layer having low roughness and a small thickness. The sidewall spacer layer 660-4 may be formed on sidewalls of the variable resistance element 60-4. That is, the semiconductor device shown in FIG. 9E may include the shield layers 10-1 and 10-2 disposed in the variable resistance element 60-4 and the sidewall spacer layer 660-4 disposed on sidewalls of the variable resistance element 60-4.

Figure 9F:
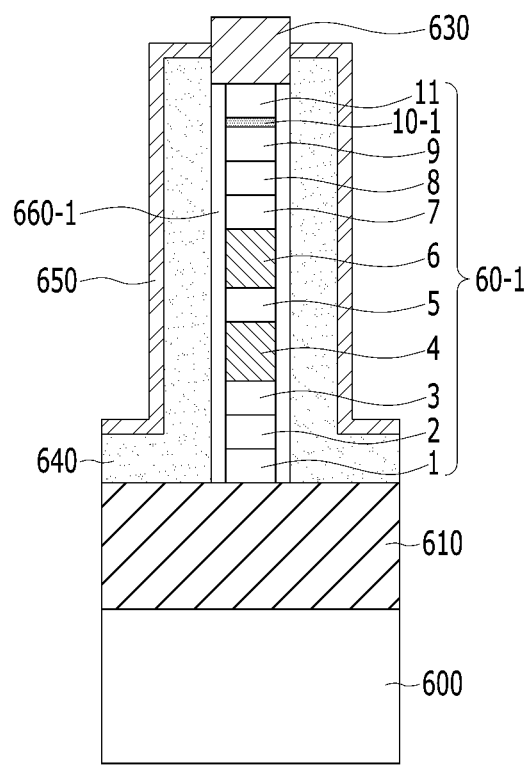

Referring to FIG. 9F, the semiconductor device may include a substrate 600, first conductive lines 610, a variable resistance element 60-1, second conductive lines 630, an encapsulation layer 640, a shield layer 650 and a sidewall spacer layer 660-1. The variable resistance element 60-1 may include a lower electrode layer 1, a buffer layer 2, an under layer 3, a free layer 4, a tunnel barrier layer 5, a pinned layer 6, a spacer layer 7, a magnetic correction layer 8, a capping layer 9, a shield layer 10-1 and an upper electrode layer 11 which are sequentially stacked. Each of the shield layers 10-1 and 650 may include the MXene material and be formed as a uniform layer having low roughness and a small thickness. The sidewall spacer layer 660-1 may be formed on sidewalls of the variable resistance element 60-1. That is, the semiconductor device shown in FIG. 9F may include the shield layer disposed in the variable resistance element 60-1, the shield layer 65 over the encapsulation layer 640 and sidewall spacer layer 660-1 disposed on sidewalls of the variable resistance element 60-1.

Figure 9G:
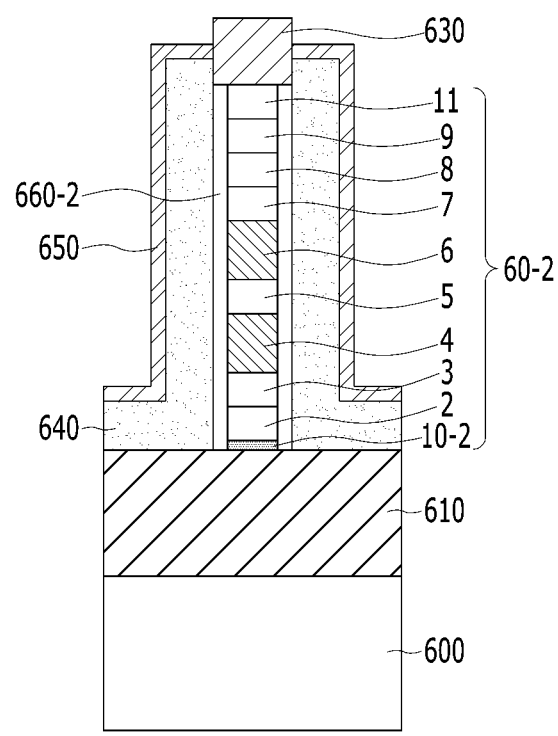

Referring FIG. 9G, the semiconductor device may include a substrate 600, first conductive lines 610, a variable resistance element 60-2, second conductive lines 630, an encapsulation layer 640, a shield layer 650 and a sidewall spacer layer 660-2. The variable resistance element 60-2 may include a shield layer 10-2, a buffer layer 2, an under layer 3, a free layer 4, a tunnel barrier layer 5, a pinned layer 6, a spacer layer 7, a magnetic correction layer 8, a capping layer 9 and an upper electrode layer 11 which are sequentially stacked. Each of the shield layers 10-2 and 650 may include the MXene material and be formed as a uniform layer having low roughness and a small thickness. The sidewall spacer layer 660-2 may be formed on sidewalls of the variable resistance element 60-2. That is, the semiconductor device shown in FIG. 9G may include the shield layer 10-2 disposed in the variable resistance element 60-2, the shield layer 650 disposed over the encapsulation layer 640 and the sidewall spacer layer 660-2 disposed on sidewalls of the variable resistance element 60-2.

Figure 9H:
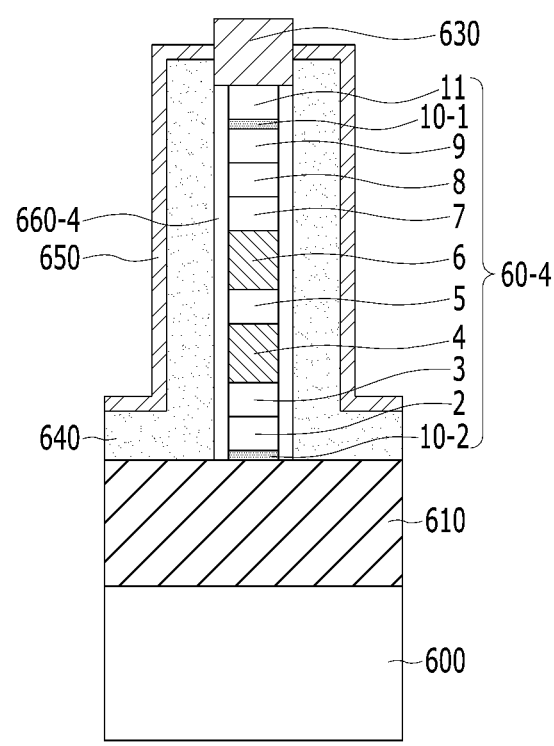

Referring to FIG. 9H, the semiconductor device may include a substrate 600, first conductive lines 610, a variable resistance element 60-4, second conductive lines 630, an encapsulation layer 640, a shield layer 650 and a sidewall spacer layer 660-4. The variable resistance element 60-4 may include a shield layer 10-2, a buffer layer 2, an under layer 3, a free layer 4, a tunnel barrier layer 5, a pinned layer 6, a spacer layer 7, a magnetic correction layer 8, a capping layer 9, a shield layer 10-1 and an upper electrode layer 11 which are sequentially stacked. Each of the shield layers 10-1, 10-2 and 650 may include the MXene material and be formed as a uniform layer having low roughness and a small thickness. The sidewall spacer layer 660-4 may be formed on sidewalls of the variable resistance element 60-4. That is, the semiconductor device shown in FIG. 9H may include the shield layers 10-1 and 10-2 disposed in the variable resistance element 60-4, the shield layer 650 disposed over the encapsulation layer 640 and the sidewall spacer layer 660-4 disposed on sidewalls of the variable resistance element 60-4.

While this patent document contains many specifics, these should not be construed as limitations on the scope of any invention or of what may be claimed, but rather as descriptions of features that may be specific to particular embodiments of particular inventions. Certain features that are described in this patent document in the context of separate embodiments can also be implemented in combination in a single embodiment. Conversely, various features that are described in the context of a single embodiment can also be implemented in multiple embodiments separately or in any suitable sub combination. Moreover, although features may be described above as acting in certain combinations and even initially claimed as such, one or more features from a claimed combination can in some cases be excised from the combination, and the claimed combination may be directed to a sub combination or variation of a sub combination.

Similarly, while operations are depicted in the drawings in a particular order, this should not be understood as requiring that such operations be performed in the particular order shown or in sequential order, or that all illustrated operations be performed, to achieve desirable results. Moreover, the separation of various system components in the embodiments described in this patent document should not be understood as requiring such separation in all embodiments.

Only a few embodiments and examples are described. Enhancements and variations of the disclosed embodiments and other embodiments can be made based on what is described and illustrated in this patent document.

What is claimed is:

1. A semiconductor device, comprising:
   a first conductive line;
   a second conductive line disposed over the first conductive line and spaced apart from the first conductive line;
   a memory cell disposed between the first conductive line and the second conductive line and including a memory layer; and
   one or more shield layers disposed at least one of at a first location over the memory layer or a second location under the memory layer, the one or more shield layers including an MXene material and configured to shield the memory layer from electromagnetic interference.

2. The semiconductor device according to claim 1, wherein the MXene material includes at least one of $Sc_2C$, $Ti_2C$, $Ti_2N$, $Zr_2C$, $Zr_2N$, $Hf_2C$, $Hf_2N$, $V_2C$, $V_2N$, $Nb_2C$, $Ta_2C$, $Cr_2C$, $Cr_2N$, $Mo_2C$, $Mo_{1.3}C$, $Cr_{1.3}C$, $(Ti, V)_2C$, $(Ti, Nb)_2C$, $W_2C$, $W_{1.3}C$, $MO_2N$, $Nb_{1.3}C$, $MO_{1.3}Y_{0.6}C$, $Ti_3C_2$, $Ti_3N_2$, $Ti_3$ $(CN)$, $Zr_3C_2$, $(Ti, V)_3C_2$, $(Ti_2Nb)C_2$, $(Ti_2Ta)C_2$, $(Ti_2Mn)C_2$, $Hf_3C_3$, $(Hf_2V)C_2$, $(Hf_2Mn)C_2$, $(V_2Ti)C_2$, $(Cr_2Ti)C_2$, $(Cr_2V)C_2$, $(Cr_2Nb)C_2$, $(Cr_2Ta)C_2$, $(Mo_2Sc)C_2$, $(Mo_2Ti)C_2$, $(Mo_2Zr)C_2$, $(Mo_2Hf)C_2$, $(Mo_2V)C_2$, $(Mo_2Nb)C_2$, $(Mo_2Ta)C_2$, $(W_2Ti)C_2$, $(W_2Zr)C_2$, $(W_2Hf)C_2$, $Ti_4N_3$, $V_4C_3$, $Nb_4C_3$, $Ta_4C_3$, $(Ti, Nb)_4C_3$, $(Nb, Zr)_4C_3$, $(Ti_2Nb_2)C_3$, $(Ti_2Ta_2)C_3$, $(V_2Ti_2)C_3$, $(V_2Nb_2)C_3$, $(V_2Ta_2)C_3$, $(Nb_2Ta_2)C_3$, $(Cr_2Ti_2)C_3$, $(Cr_2V_2)C_3$, $(Cr_2Nb_2)C_3$, $(Cr_2Ta_2)C_3$, $(Mo_2Ti_2)C_3$, $(Mo_2Zr_2)C_3$, $(MO_2Hf_2)C_3$, $(MO_2V_2)C_3$, $(Mo_2Nb_2)C_3$, $(Mo_2Ta_2)C_3$, $(W_2Ti_2)C_3$, $(W_2Zr_2)C_3$, or $(W_2Hf_2)C_3$.

3. The semiconductor device according to claim 1, wherein the memory layer includes at least one of a variable resistance material, a phase change material, a ferromagnetic material, or a ferroelectric material.

4. The semiconductor device according to claim 1, further comprising at least one of 1) a first electrode layer disposed between the first conductive line and the memory layer, or 2) a second electrode layer disposed between the second conductive line and the memory layer.

5. The semiconductor device according to claim 4, wherein a thickness of each of the one or more shield layers is smaller than a thickness of the first electrode layer or the second electrode layer.

6. The semiconductor device according to claim 4, wherein the one or more shield layers are disposed between the first electrode layer and the memory layer, between the memory layer and the second electrode layer, or between the first electrode layer and the memory layer and between the memory layer and the second electrode layer.

7. The semiconductor device according to claim 1, further comprising a selector layer disposed between the first conductive line and the memory layer, or between the memory layer and the second conductive line.

8. The semiconductor device according to claim 7, wherein the one or more shield layers are disposed between the memory layer and the selector layer.

9. The semiconductor device according to claim 7, further comprising a third electrode layer disposed between the memory layer and the selector layer.

10. The semiconductor device according to claim 1, further comprising:
    an encapsulation layer disposed to encapsulate the memory cell; and
    an additional shield layer disposed over the encapsulation layer,
    wherein the additional shield layer includes an MXene material.

11. The semiconductor device according to claim 10, further comprising a sidewall spacer layer disposed on sidewalls of the memory layer.

12. The semiconductor device according to claim 10, further comprising a selector layer between the first conductive line and the memory layer, or between the memory layer and the second conductive line.

13. The semiconductor device according to claim 12, wherein the one or more shield layers are disposed between the memory layer and the selector layer.

14. The semiconductor device according to claim 12, further comprising a third electrode layer disposed between the memory layer and the selector layer.

15. A semiconductor device comprising:
    a plurality of memory cells disposed over a substrate, each of the plurality of memory cells including a memory layer;
    an encapsulation layer disposed to encapsulate each of the plurality of memory cells; and
    a shield layer disposed over the encapsulation layer and including an MXene material and configured to shield the memory layer from electromagnetic interference.

16. The semiconductor device according to claim 15, wherein the MXene material includes at least one of $Sc_2C$, $Ti_2C$, $Ti_2N$, $Zr_2C$, $Zr_2N$, $Hf_2C$, $Hf_2N$, $V_2C$, $V_2N$, $Nb_2C$, $Ta_2C$, $Cr_2C$, $Cr_2N$, $Mo_2C$, $MO_{1.3}C$, $Cr_{1.3}C$, $(Ti, V)_2C$, $(Ti, Nb)_2C$, $W_2C$, $W_{1.3}C$, $MO_2N$, $Nb_{1.3}C$, $MO_{1.3}Y_{0.6}C$, $Ti_3C_2$, $Ti_3N_2$, $Ti_3$ $(CN)$, $Zr_3C_2$, $(Ti, V)_3C_2$, $(Ti_2Nb)C_2$, $(Ti_2Ta)C_2$, $(Ti_2Mn)C_2$, $Hf_3C_3$, $(Hf_2V)C_2$, $(Hf_2Mn)C_2$, $(V_2Ti)C_2$, $(Cr_2Ti)C_2$, $(Cr_2V)C_2$, $(Cr_2Nb)C_2$, $(Cr_2Ta)C_2$, $(Mo_2Sc)C_2$, $(Mo_2Ti)C_2$, $(Mo_2Zr)C_2$, $(Mo_2Hf)C_2$, $(Mo_2V)C_2$, $(Mo_2Nb)C_2$, $(Mo_2Ta)C_2$, $(W_2Ti)C_2$, $(W_2Zr)C_2$, $(W_2Hf)C_2$, $Ti_4N_3$, $V_4C_3$, $Nb_4C_3$, $Ta_4C_3$, $(Ti, Nb)_4C_3$, $(Nb, Zr)_4C_3$, $(Ti_2Nb_2)C_3$, $(Ti_2Ta_2)C_3$, $(V_2Ti_2)C_3$, $(V_2Nb_2)C_3$, $(V_2Ta_2)C_3$, $(Nb_2Ta_2)C_3$, $(Cr_2Ti_2)C_3$, $(Cr_2V_2)C_3$, $(Cr_2Nb_2)C_3$, $(Cr_2Ta_2)C_3$, $(Mo_2Ti_2)C_3$, $(Mo_2Zr_2)C_3$, $(Mo_2Hf_2)C_3$, $(Mo_2V_2)C_3$, $(Mo_2Nb_2)C_3$, $(Mo_2Ta_2)C_3$, $(W_2Ti_2)C_3$, $(W_2Zr_2)C_3$, or $(W_2Hf_2)C_3$.

17. The semiconductor device according to claim 15, wherein the encapsulation layer includes an insulating material.

18. The semiconductor device according to claim 15, further comprising a sidewall spacer layer disposed on sidewalls of the memory layer.

19. The semiconductor device according to claim 15, further comprising a selector layer disposed over or under the memory layer.

20. The semiconductor device according to claim 15, further comprising a first conductive line disposed over the substrate and a second conductive line disposed to be spaced apart from the first conductive line,
wherein each of the plurality of memory cells is disposed between the first conductive line and the second conductive line.

21. The semiconductor device according to claim 20, further comprising at least one of 1) a first electrode layer disposed between the first conductive line and each of the plurality of memory cells, or 2) a second electrode layer disposed between each of the plurality of memory cells and the second conductive lines.

22. The semiconductor device according to claim 21, wherein a thickness of the shield layer is smaller than a thickness of the first electrode layer or the second electrode layer.

23. The semiconductor device according to claim 15, wherein the memory layer includes at least one of a variable resistance material, a phase change material, a ferromagnetic material, or a ferroelectric material.

24. The semiconductor device according to claim 19, further comprising a third electrode layer disposed between the memory layer and the selector layer.

* * * * *